(12) United States Patent
Han et al.

(10) Patent No.: US 11,683,789 B2
(45) Date of Patent: Jun. 20, 2023

(54) INFORMATION INDICATION METHOD AND APPARATUS

(71) Applicant: HUAWEI TECHNOLOGIES CO., LTD., Shenzhen (CN)

(72) Inventors: Xiao Han, Shenzhen (CN); Mengyao Ma, Shenzhen (CN); Yan Xin, Ottawa (CA); Chenlong Jia, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 16/882,047

(22) Filed: May 22, 2020

(65) Prior Publication Data

US 2020/0288470 A1 Sep. 10, 2020

Related U.S. Application Data

(63) Continuation of application No. PCT/CN2018/113059, filed on Oct. 31, 2018.

(30) Foreign Application Priority Data

Nov. 24, 2017 (CN) .......................... 201711195871.3

(51) Int. Cl.
*H04W 72/04* (2023.01)
*H04L 1/16* (2023.01)
(Continued)

(52) U.S. Cl.
CPC ........... *H04W 72/0446* (2013.01); *H04L 1/16* (2013.01); *H04B 7/06* (2013.01)

(58) Field of Classification Search
CPC ............................. H04W 72/0446; H04L 1/16
(Continued)

(56) References Cited

U.S. PATENT DOCUMENTS

2013/0308464 A1* 11/2013 Park ..................... H04W 72/20
370/329
2014/0044092 A1* 2/2014 Guan .................... H04L 1/1854
370/330
(Continued)

FOREIGN PATENT DOCUMENTS

CN 102036258 A 4/2011
CN 102405554 A 4/2012
(Continued)

OTHER PUBLICATIONS

U.S. Appl. No. 62/581,509, filed Nov. 3, 2017.*
(Continued)

*Primary Examiner* — Faisal Choudhury
(74) *Attorney, Agent, or Firm* — Leydig, Voit & Mayer, Ltd.

(57) ABSTRACT

This application provides an information indication method and an apparatus. In this application, a sending apparatus generates and sends a first frame, the first frame includes at least one piece of sub-time resource indication information, and each piece of sub-time resource indication information is in a one-to-one correspondence with one of at least one response apparatus. In addition, each piece of sub-time resource indication information includes a time resource at which the corresponding response apparatus sends feedback information for the first frame to the sending apparatus and a time resource at which the sending apparatus sends acknowledgment information for the feedback information to the corresponding response apparatus, so that the at least one response apparatus and the sending apparatus that sends the first frame can simultaneously perform beamforming (Continued)

training, thereby improving effectiveness of beamforming training performed on the sending apparatus and the at least one response apparatus.

14 Claims, 16 Drawing Sheets

(51) Int. Cl.
*H04W 72/0446* (2023.01)
*H04B 7/06* (2006.01)

(58) Field of Classification Search
USPC ......................................................... 370/329
See application file for complete search history.

(56) References Cited

U.S. PATENT DOCUMENTS

| | | | | |
|---|---|---|---|---|
| 2015/0131517 | A1* | 5/2015 | Chu | H04L 5/0037 370/312 |
| 2015/0249953 | A1* | 9/2015 | Kim | H04W 48/16 370/254 |
| 2016/0149687 | A1* | 5/2016 | Lei | H04W 48/08 370/280 |
| 2016/0345277 | A1* | 11/2016 | Segev | H04W 56/001 |
| 2017/0079031 | A1 | 3/2017 | Maltsev, Jr. et al. | |
| 2017/0105229 | A1* | 4/2017 | Luo | H04W 72/0446 |

FOREIGN PATENT DOCUMENTS

| | | |
|---|---|---|
| CN | 105324944 A | 2/2016 |
| WO | 2017146861 A1 | 8/2017 |
| WO | 2017156315 A1 | 9/2017 |
| WO | WO-2019/070746 | * 10/2018 |

OTHER PUBLICATIONS

"IEEE Std 802.11 ad-2012, Part 11: Wireless LAN Medium Access Control (MAC) and Physical Layer (PHY) Specifications, Amendment 3: Enhancements for Very High Throughput in the 60 GHz Band; IEEE Std 802.11ad-2012," IEEE Computer Society, pp. 1-628, Institute of Electrical and Electronics Engineers, New York, New York (Dec. 2012).

"P802.11ay/D0.35, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz," LAN/MAN Standards Committee of the IEEE Computer Society, pp. 1-256, Institute of Electrical and Electronics Engineers, New York, New York (May 2017).

* cited by examiner

INFORMATION INDICATION METHOD AND APPARATUS

CROSS-REFERENCE TO RELATED APPLICATIONS

This application is a continuation of International Application No. PCT/CN2018/113059, filed on Oct. 31, 2018, which claims priority to Chinese Patent Application No. 201711195871.3, filed on Nov. 24, 2017. The disclosures of the aforementioned applications are hereby incorporated by reference in their entireties.

TECHNICAL FIELD

Embodiments of this application relate to the communications field, and in particular, to an information indication method and an apparatus in the communications field.

BACKGROUND

IEEE 802.11ad/ay is one of standards for millimeter-wave wireless communication applications in wireless local area network communication. Wide available bandwidth of a millimeter-wave band may bring a high communication rate. However, a millimeter-wave signal is severely attenuated on a channel, and a path loss is large. Therefore, in millimeter-wave communication, a directional beamforming (BF) technology needs to be used to provide an additional transmit/receive antenna gain to overcome signal attenuation. Because a directional beam is used, a data sender/receiver needs to concentrate a sending direction/receiving direction of the data sender/receiver within a relatively small angle range. To implement data transmission and reception, a transmit beam direction of the data sender needs to cover a receive beam direction of the data receiver, in other words, a transmit beam can be aligned with a receive beam. In 802.11ad, a process of beam alignment between a PCP/AP (PBSS Control Point or Access Point, PBSS refers to personal basic service set) and a station (STA) is referred to as a beamforming training process.

In a mesh distribution network, one access point is connected to and communicates with a plurality of access points or a plurality of stations at the same time. Beamforming training needs to be performed on the access point and the plurality of access points or the plurality of stations that are connected to the access point before data exchange. How to make the access point and the plurality of access points or the plurality of stations that are connected to the access point perform efficient beamforming training is an urgent problem to be resolved.

SUMMARY

Embodiments of this application provide an information indication method and an apparatus, to improve effectiveness of beamforming training performed on a sending apparatus and at least one response apparatus.

According to a first aspect, an embodiment of this application provides an information indication method, including:

generating, by a sending apparatus, a first frame, where the first frame includes time resource indication information; and sending, by the sending apparatus, the first frame to at least one response apparatus, where the time resource indication information includes at least one piece of sub-time resource indication information, each piece of sub-time resource indication information is in a one-to-one correspondence with one of the at least one response apparatus, and each piece of sub-time resource indication information includes a time resource at which the corresponding response apparatus sends feedback information for the first frame to the sending apparatus and a time resource at which the sending apparatus sends acknowledgment information for the feedback information to the corresponding response apparatus.

It should be understood that the first frame includes the at least one piece of sub-time resource indication information, and each piece of sub-time resource indication information is in a one-to-one correspondence with one of the at least one response apparatus. In addition, each piece of sub-time resource indication information includes the time resource at which the corresponding response apparatus sends the feedback information for the first frame to the sending apparatus and the time resource at which the sending apparatus sends the acknowledgment information for the feedback information to the corresponding response apparatus, so that the at least one response apparatus and the sending apparatus that sends the first frame can simultaneously perform beamforming training, thereby improving effectiveness of beamforming training performed on the sending apparatus and the at least one response apparatus.

In a first possible implementation of the first aspect, the first frame includes a time resource indication field, and the time resource indication field is used to indicate a time resource at which the at least one response apparatus sends feedback information for the first frame to the sending apparatus and a time resource at which the sending apparatus sends acknowledgment information for the feedback information to the at least one response apparatus.

Specifically, the time resource indication field is used to carry the time resource indication information.

With reference to the foregoing possible implementation of the first aspect, in another possible implementation of the first aspect, the first frame further includes a destination indication field, and when the destination indication field is a first-type value, the time resource indication field includes one sub-time resource indication field.

With reference to the foregoing possible implementation of the first aspect, in another possible implementation of the first aspect, the first frame further includes a destination indication field, and when the destination indication field is a second-type value, the time resource indication field includes at least two sub-time resource indication fields.

It should be understood that different values of the destination indication field indicate different quantities of sub-time resource indication fields included in the time resource indication field. When the destination indication field is the first-type value, the time resource indication field includes one sub-time resource indication field. When the destination indication field is the second-type value, the time resource indication field includes at least two sub-time resource indication fields.

Based on this, the sending apparatus may select to send different first frames based on a quantity of response apparatuses. When the sending apparatus sends the first frame to one response apparatus, the destination indication field in the first frame is the first-type value, and the time resource indication field includes one sub-time resource indication field. When the sending apparatus sends the first frame to at least two response apparatuses, the destination indication field in the first frame is the second-type value, and the time resource indication field includes at least two sub-time resource indication fields. Certainly, when the sending apparatus sends the first frame to one response apparatus, the destination indication field in the first frame is the second-type value, and the time resource indication field includes one sub-time resource indication field.

In another possible implementation of the first aspect, each sub-time resource indication field includes one or any combination of the following pieces of information:

an identifier subfield used to identify one of the at least two response apparatuses, and a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield.

In another possible implementation of the first aspect, the first frame further includes a response apparatus quantity field, and the response apparatus quantity field is used to indicate a quantity of at least one response apparatus.

In another possible implementation of the first aspect, each sub-time resource indication field further includes a continuation indication subfield or an end indication subfield, the continuation indication subfield is used to indicate whether there is a next sub-time resource indication field in the first frame, and the end indication subfield is used to indicate whether the time resource indication field ends.

In another possible implementation of the first aspect, the identifier subfield is a Media Access Control (MAC) address of the corresponding response apparatus, or an ID with a length that is obtained through calculation based on the MAC address of the corresponding response apparatus and that is less than that of the MAC address, or a pre-allocated ID.

In another possible implementation of the first aspect, the sending apparatus receives, at the time resource at which the corresponding response apparatus sends the feedback information for the first frame to the sending apparatus, a feedback frame sent by the corresponding response apparatus, where the feedback frame includes the feedback information of the corresponding response apparatus for the first frame.

In another possible implementation of the first aspect, the sending apparatus sends an acknowledgment frame to the corresponding response apparatus at the time resource at which the sending apparatus sends the acknowledgment information for the feedback information to the corresponding response apparatus, where the acknowledgment frame includes the acknowledgment information for the feedback information.

According to a second aspect, an embodiment of this application provides an information indication method, including:

receiving, by a response apparatus, a first frame, where the first frame includes time resource indication information, the time resource indication information includes at least one piece of sub-time resource indication information, each piece of sub-time resource indication information is in a one-to-one correspondence with one of at least one response apparatus, and each piece of sub-time resource indication information includes a time resource at which the corresponding response apparatus sends feedback information for the first frame to a sending apparatus and a time resource at which the sending apparatus sends acknowledgment information for the feedback information to the corresponding response apparatus; and obtaining, by the response apparatus based on the first frame, a time resource at which the response apparatus sends feedback information for the first frame to the sending apparatus and a time resource at which the sending apparatus sends acknowledgment information for the feedback information to the response apparatus.

It should be understood that the first frame includes the at least one piece of sub-time resource indication information, and each piece of sub-time resource indication information is in a one-to-one correspondence with one of the at least one response apparatus. In addition, each piece of sub-time resource indication information includes the time resource at which the corresponding response apparatus sends the feedback information for the first frame to the sending apparatus and the time resource at which the sending apparatus sends the acknowledgment information for the feedback information to the corresponding response apparatus, so that the at least one response apparatus and the sending apparatus that sends the first frame can simultaneously perform beamforming training, thereby improving effectiveness of beamforming training performed on the sending apparatus and the at least one response apparatus.

In another possible implementation of the second aspect, the method further includes: receiving, by the response apparatus, a second frame, where the second frame includes indication information used to indicate a sending time of the first frame.

In another possible implementation of the second aspect, the receiving, by a response apparatus, a first frame is specifically: receiving, by the response apparatus, the first frame at the sending time, of the first frame, that is indicated by the indication information.

In another possible implementation of the second aspect, the first frame includes a time resource indication field, and the time resource indication field is used to indicate a time resource at which the at least one response apparatus sends feedback information for the first frame to the sending apparatus and a time resource at which the sending apparatus sends acknowledgment information for the feedback information to the at least one response apparatus.

In another possible implementation of the second aspect, the first frame further includes a destination indication field, and when the destination indication field is a second-type value, the time resource indication field includes at least two sub-time resource indication fields.

In another possible implementation of the second aspect, the first frame further includes a destination indication field, and when the destination indication field is a first-type value, the time resource indication field includes one sub-time resource indication field.

In another possible implementation of the second aspect, each sub-time resource indication field includes one or any combination of the following pieces of information:

an identifier subfield used to identify one of at least two response apparatuses, and a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield.

In another possible implementation of the second aspect, the first frame further includes a response apparatus quantity field, and the response apparatus quantity field is used to indicate a quantity of at least two response apparatus.

In another possible implementation of the second aspect, each sub-time resource indication field further includes a continuation indication subfield or an end indication subfield, the continuation indication subfield is used to indicate whether there is a next sub-time resource indication field in the first frame, and the end indication subfield is used to indicate whether the time resource indication field ends.

In another possible implementation of the second aspect, the identifier subfield is a MAC address of the corresponding response apparatus, or an identification (ID) with a length that is obtained through calculation based on the MAC address of the corresponding response apparatus and that is less than that of the MAC address, or a pre-allocated ID.

In another possible implementation of the second aspect, the response apparatus sends a feedback frame to the sending apparatus at the time resource at which the response apparatus sends the feedback information for the first frame to the sending apparatus, where the feedback frame includes the feedback information of the corresponding response apparatus for the first frame.

In another possible implementation of the second aspect, the response apparatus receives, at the time resource at which the sending apparatus sends the acknowledgment information for the feedback information to the response apparatus, an acknowledgment frame sent by the sending apparatus, where the acknowledgment frame includes the acknowledgment information for the feedback information.

According to a third aspect, an embodiment of this application provides a sending apparatus, configured to perform the method according to any one of the first aspect or the possible implementations of the first aspect. Specifically, the sending apparatus includes a unit configured to perform the method according to any one of the first aspect or the possible implementations of the first aspect.

According to a fourth aspect, an embodiment of this application provides a response apparatus, configured to perform the method according to any one of the second aspect or the possible implementations of the second aspect. Specifically, the response apparatus includes a unit configured to perform the method according to any one of the second aspect or the possible implementations of the second aspect.

According to a fifth aspect, an embodiment of this application provides a sending device, where the sending device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the sending device enables the processor to perform the method according to any one of the first aspect or the possible implementations of the first aspect.

According to a sixth aspect, an embodiment of this application provides a response device, where the response device includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal and control a transmitter to send a signal. In addition, when the processor executes the instruction stored in the memory, the response device enables the processor to perform the method according to any one of the second aspect or the possible implementations of the second aspect.

According to a seventh aspect, an embodiment of this application provides a computer readable medium, configured to store a computer program, where the computer program includes an instruction that is used to perform the method according to any one of the first aspect or the possible implementations of the first aspect.

According to an eighth aspect, an embodiment of this application provides a computer readable medium, configured to store a computer program, where the computer program includes an instruction that is used to perform the method according to any one of the second aspect or the possible implementations of the second aspect.

According to a ninth aspect, an embodiment of this application provides a computer program, where the computer program includes an instruction that is used to perform the method according to any one of the first aspect or the possible implementations of the first aspect.

According to a tenth aspect, an embodiment of this application provides a computer program, where the computer program includes an instruction that is used to perform the method according to any one of the second aspect or the possible implementations of the second aspect.

According to an eleventh aspect, an embodiment of this application provides a chip, where the chip includes a processing circuit and a transceiver pin. The transceiver pin and the processor communicate with each other by using an internal connection path, and the processor performs the method according to any one of the first aspect or the possible implementations of the first aspect, to control a receive pin to receive a signal and control a transmit pin to send a signal.

According to a twelfth aspect, an embodiment of this application provides a chip, where the chip includes a processing circuit and a transceiver pin. The transceiver pin and the processor communicate with each other by using an internal connection path, and the processor performs the method according to any one of the second aspect or the possible implementations of the second aspect, to control a receive pin to receive a signal and control a transmit pin to send a signal.

DESCRIPTION OF EMBODIMENTS

Figure 1:
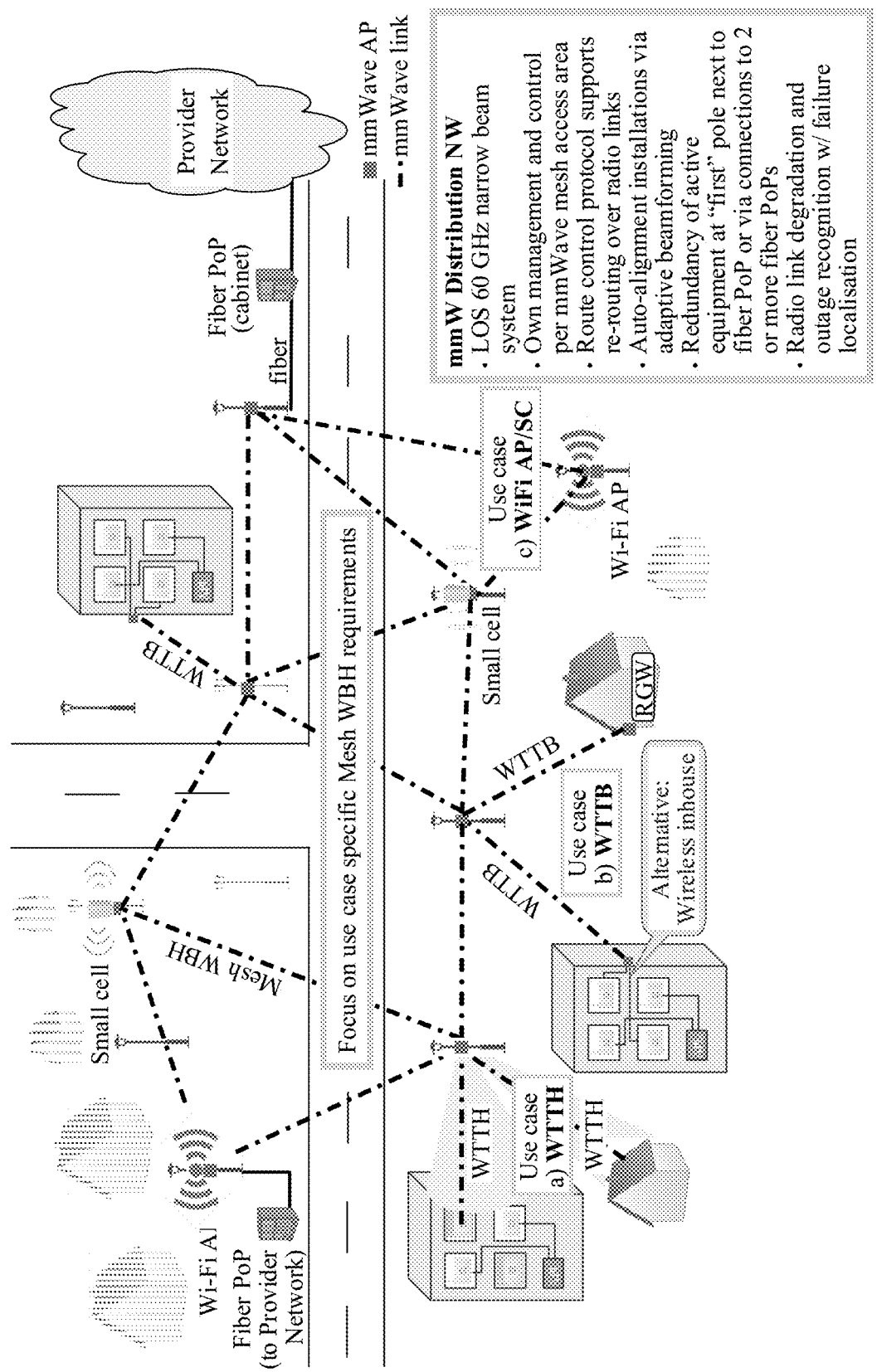
FIG. 1 is a schematic diagram of a mesh distribution network system.

The following describes the technical solutions in the embodiments of this application with reference to the accompanying drawings in the embodiments of this application.

It should be understood that the technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD) system, a universal mobile telecommunication system (UMTS), a worldwide interoperability for microwave access (WiMAX) communications system, and a future 5G communications system.

It should be further understood that the technical solutions in the embodiments of this application may be further applied to various communications systems that are based on a non-orthogonal multiple access technology, such as a sparse code multiple access (SCMA) system. Certainly, the SCMA may also have another name in the communications field. Further, the technical solutions in the embodiments of this application may be applied to a multicarrier transmission system in which the non-orthogonal multiple access technology is used, such as an orthogonal frequency division multiplexing (OFDM) system, a filter bank multicarrier (FBMC) system, a generalized frequency division multiplexing (GFDM) system, or a filtered orthogonal frequency division multiplexing (filtered-OFDM, F-OFDM) system in which the non-orthogonal multiple access technology is used.

It should be further understood that the embodiments of this application are applicable to an LTE system and a subsequent evolved system such as 5G or other wireless communications systems in which various radio access technologies are used, for example, systems in which access technologies such as code division multiple access, frequency division multiple access, time division multiple access, orthogonal frequency division multiple access, and single carrier frequency division multiple access are used, and particularly, applicable to a scenario in which channel information needs to be fed back and/or a two-stage precoding technology needs to be used, for example, a wireless network using a massive MIMO technology or a wireless network using a distributed antenna technology.

The foregoing various communications systems include at least one network device. The network device may be a device that communicates with a terminal device, for example, a base station or a base station controller. Each network device may provide communication coverage for a specific geographic area, and may communicate with a terminal device (for example, UE) located in the coverage area (a cell). The network device may be a base transceiver station (BTS) in a GSM system or a code division multiple access (CDMA) system, a nodeB (NB) in a WCDMA system, an evolved NodeB (eNB or eNodeB) in an LTE system, or a radio controller in a cloud radio access network (CRAN). Alternatively, the network device may be a relay station, an access point, a vehicle-mounted device, a wearable device, a network side device in a future 5G network, a network device in a future evolved public land mobile network (PLMN), or the like.

The foregoing various communications systems further include at least one terminal device located within coverage of a network device. The terminal device may be mobile or fixed. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a session initiation protocol (SIP) phone, a wireless local loop (WLL) station, personal digital processing (PDA), a handheld device having a wireless communication function, a computing device or another processing device connected to a wireless modem, a vehicle-mounted device, a wearable device, a terminal device in a future 5G network, a terminal device in a future evolved public land mobile network (PLMN), or the like.

It should be further understood that the embodiments of this application are further applicable to a mesh distribution network system. As shown in FIG. 1, the mesh distribution network system includes a plurality of APs and a plurality of STAs, and one AP communicates with a plurality of other APs or a plurality of other STAs.

Figure 2:
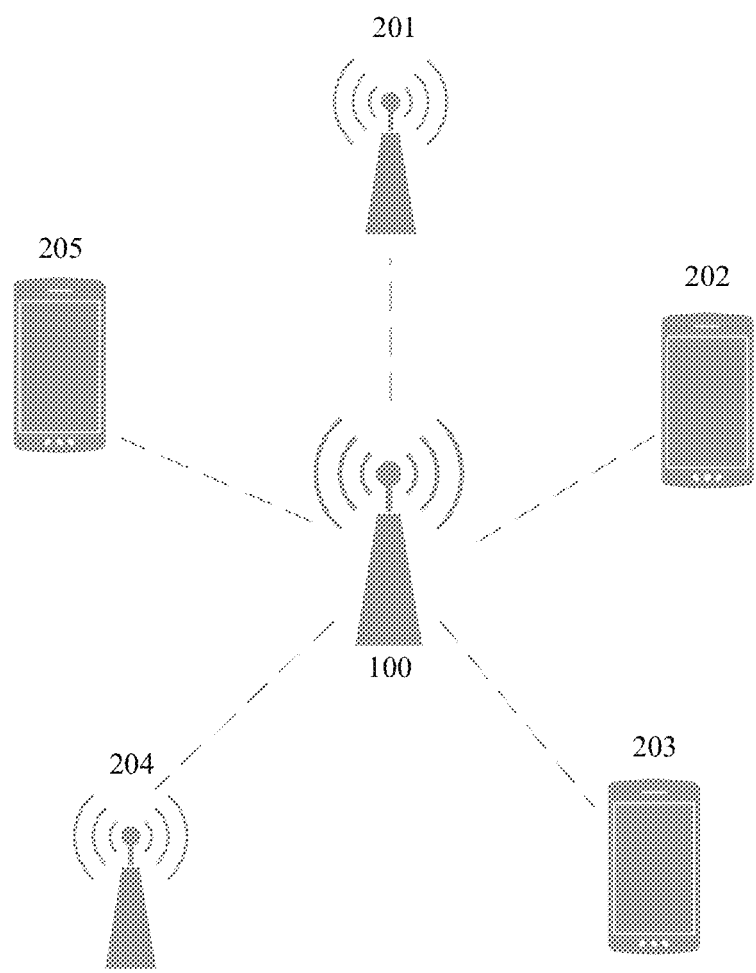
FIG. 2 is a schematic diagram of an application scenario according to an embodiment of this application.

FIG. 2 is a schematic diagram of an application scenario according to an embodiment of this application. As shown in FIG. 2, a sending apparatus 100 is connected to and communicates with at least one response apparatus (201, 202, 203, 204, and 205). Beamforming training needs to be performed on the sending apparatus 100 and the at least one response apparatus (201, 202, 203, 204, and 205) before data exchange. How to make the sending apparatus 100 and the at least one response apparatus (201, 202, 203, 204, and 205) perform efficient beamforming training is an urgent technical problem that needs to be resolved in the embodiments of this application.

It should be understood that the sending apparatus 100 may be an access point or a station, and the response apparatus (201, 202, 203, 204, and 205) may be an access point or a station. This is not limited in this embodiment of this application.

It should be further understood that FIG. 2 is shown by using only five response apparatuses (201, 202, 203, 204, and 205) as an example. However, this embodiment of this application is not limited to five response apparatuses, and FIG. 2 is merely a schematic representation.

Figure 3:
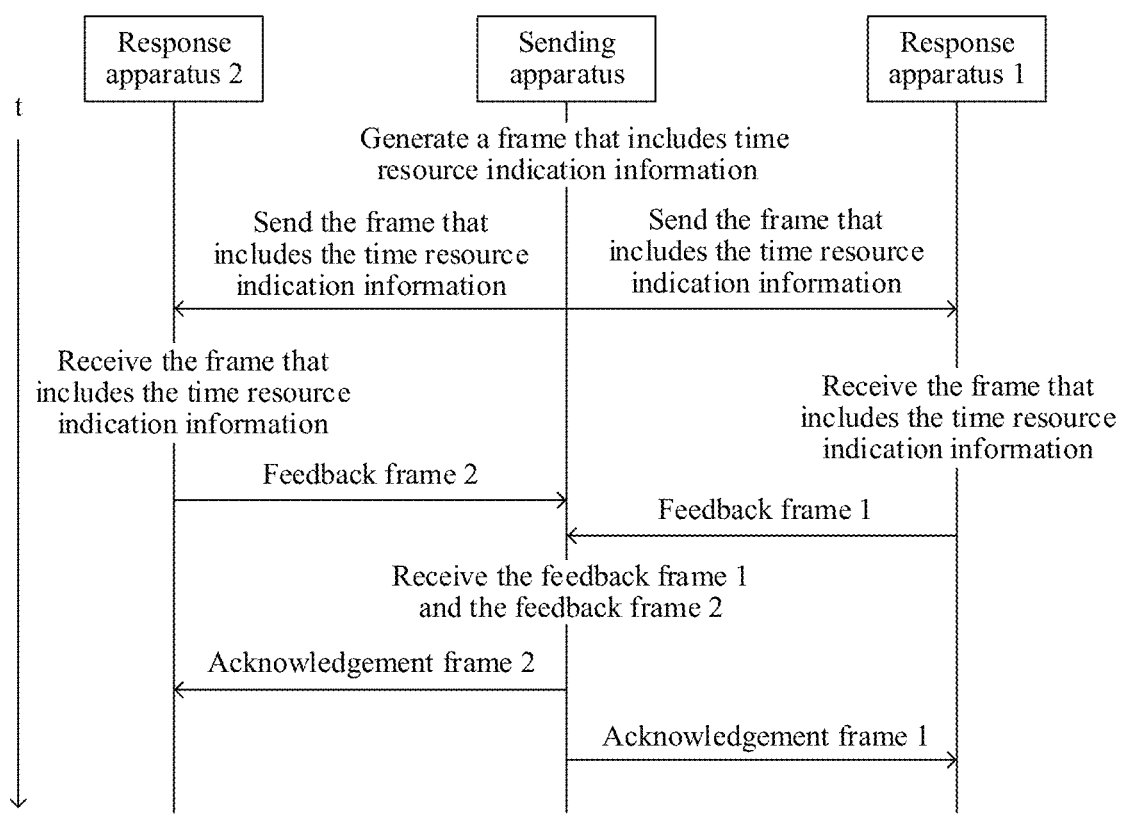
FIG. 3 is a flowchart of a method according to an embodiment of this application.

An embodiment of this application provides an information indication method. FIG. 3 is a flowchart of a method according to an embodiment of this application. As shown in FIG. 3, an information indication method includes the following steps.

S101. A sending apparatus generates a first frame, where the first frame includes time resource indication information, the time resource indication information includes at least one piece of sub-time resource indication information, each piece of sub-time resource indication information is in a one-to-one correspondence with one of at least one response apparatus, and each piece of sub-time resource indication information includes a time resource at which the corresponding response apparatus sends feedback information for the first frame to the sending apparatus and a time resource at which the sending apparatus sends acknowledgment information for the feedback information to the corresponding response apparatus.

The first frame in S101 is, for example, a TDD SSW-A frame such as a TDD SSW schedule frame.

In S101, as shown in FIG. 2, the sending apparatus 100 is connected to and communicates with the at least one response apparatus (201, 202, 203, 204, and 205), and the sending apparatus 100 generates a first frame. The first frame includes a time resource indication field, and the time resource indication field is used to indicate a time resource at which the at least one response apparatus sends feedback information for the first frame to the sending apparatus and a time resource at which the sending apparatus sends acknowledgment information for the feedback information to the at least one response apparatus.

The first frame further includes a destination indication field, and when the destination indication field is a second-type value, the time resource indication field includes at least two sub-time resource indication fields. The destination indication field is, for example, an RA field. The second-type value is, for example, a multicast address value or a broadcast address value.

When the destination indication field is a second-type value, the time resource indication field includes at least two sub-time resource indication fields. Each of the sub-time resource indication fields includes one or any combination of the following pieces of information: an identifier subfield used to identify one of at least two response apparatuses, and a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield. In a possible implementation, each of the sub-time resource indication fields includes an identifier subfield used to identify one of at least two response apparatuses, a time resource indication subfield used by the response apparatus corresponding to the identifier subfield to send feedback information for the first frame to the sending apparatus, and a time resource indication subfield used by the sending apparatus to send acknowledgment information for the feedback information to the response apparatus corresponding to the identifier subfield.

When the destination indication field is a first-type value, the time resource indication field includes one sub-time resource indication field. The first-type value is a unicast destination address value. For example, if a sending destination of the first frame is a response apparatus 1, the destination indication field is a MAC address of the response apparatus 1 or another address value that can identify the response apparatus 1. When the destination indication field is the first-type value, and the time resource indication field includes only one sub-time resource indication field, the sub-time resource indication field includes a time resource indication subfield used by a response apparatus corresponding to an identifier subfield to send feedback information for the first frame to the sending apparatus, and a time resource indication subfield used by the sending apparatus to send acknowledgment information for the feedback information to the response apparatus corresponding to the identifier subfield, and does not include an identifier subfield used to identify one of the at least one response apparatus.

For the first frame in which the destination indication field is the second-type value, in a possible implementation, the first frame further includes a response apparatus quantity field, and the response apparatus quantity field is used to indicate a quantity of at least two response apparatuses. The response apparatus quantity field is located before the time resource indication field. For example, the response apparatus quantity field is located before and adjacent to the time resource indication field. For another example, the response apparatus quantity field is located before and spaced from the time resource indication field. The response apparatus quantity field is significant for a response apparatus that receives the first frame. The response apparatus can learn of, by using the response apparatus quantity field, a location of the time resource indication field in the first frame. When parsing bits, the response apparatus may perform correct bit division, to determine bits of the time resource indication field and bits of a field following the time resource indication field.

For the first frame in which the destination indication field is the second-type value, in another possible implementation, each of the sub-time resource indication fields further includes a continuation indication subfield, and the continuation indication subfield is used to indicate whether there is a next sub-time resource indication field in the first frame.

For the first frame in which the destination indication field is the second-type value, in another possible implementation, each of the sub-time resource indication fields further includes an end indication subfield, and the end indication subfield is used to indicate whether the time resource indication field ends.

The continuation indication subfield and the end indication subfield are significant for a response apparatus that receives the first frame. The response apparatus can learn of, by using the continuation indication subfield or the end indication subfield, a location of the time resource indication field in the first frame. When parsing bits, the response apparatus may perform correct bit division, to determine bits of the time resource indication field and bits of a field following the time resource indication field.

With reference to the foregoing possible implementations, in a possible implementation solution, the identifier subfield is a MAC address of the corresponding response apparatus, or an ID with a length that is obtained through calculation based on the MAC address of the corresponding response apparatus and that is less than that of the MAC address. A shorter identifier subfield indicates fewer overheads of sending the first frame by a sending apparatus and fewer overheads of receiving the first frame by the response apparatus.

S102. The sending apparatus sends the first frame to the at least one response apparatus.

In S102, as shown in FIG. 2, the sending apparatus 100 sends the first frame to the at least one response apparatus (201, 202, 203, 204, and 205) in a broadcast or multicast manner. Specifically, the RA field in the first frame may be set to a broadcast address value or a multicast address value.

The first frame is a beamforming scanning frame, and the sending apparatus serially sends a plurality of first frames in a time division manner in one transmit sector, so that the response apparatus separately receives the plurality of first frames by using different receive sectors. In this way, beamforming scanning and alignment are performed between the sending apparatus and the response apparatus. If all receive sectors of the response apparatus cannot receive the first frame that can be decoded, the response apparatus does not have a receive sector that can be aligned with the transmit sector of the sending apparatus. If a specific receive sector of the response apparatus receives the first frame that can be decoded, the response apparatus selects the receive sector as a receive sector aligned with the transmit sector of the sending apparatus. If a plurality of receive sectors of the response apparatus receive the first frame that can be decoded, the response apparatus selects a receive sector with strongest receive energy as a receive sector aligned with the transmit sector of the sending apparatus.

It should be noted that the transmit sector described in the specification of this application has a same meaning as an AWV, a sending direction, and a transmit beam. A concept and a meaning of the receive sector are the same as those of a receiving direction and a receive beam. Details are not described herein.

It should be noted that alignment between the transmit sector and the receive sector in the specification of this application has a same meaning as pairing between the transmit beam and a receive beam and alignment between the transmit beam and the receive beam.

S103. The at least one response apparatus receives the first frame.

In S103, as shown in FIG. 2, the at least one response apparatus (201, 202, 203, 204, and 205) receives the first frame. FIG. 3 is shown by using only two response apparatuses as an example. However, this embodiment of this application is not limited to two response apparatuses. FIG. 3 is merely a schematic representation.

As described in S102, when the response apparatus does not have a receive sector that can be aligned with the transmit sector of the sending apparatus, the response apparatus cannot receive the first frame. When the response apparatus has a receive sector that can be aligned with the transmit sector of the sending apparatus, the response apparatus receives the first frame. FIG. 3 is shown by using an example in which both a response apparatus 1 and a response apparatus 2 can receive the first frame.

S104. The at least one response apparatus sends feedback information for the first frame to the sending apparatus at a time resource that is indicated by the first frame and at which the corresponding response apparatus sends the feedback information for the first frame to the sending apparatus.

In S104, after receiving the first frame, the response apparatus obtains the time resource at which the corresponding response apparatus sends the feedback information for the first frame to the sending apparatus, and sends the feedback information for the first frame to the sending apparatus at the time resource.

In a possible implementation, the response apparatus sends a feedback frame to the sending apparatus at the time resource, where the feedback frame includes the feedback information of the corresponding response apparatus for the first frame. Specifically, the feedback information for the first frame includes information about the transmit sector of the sending apparatus, and the first frame sent by the sending apparatus in the transmit sector can be received by the response apparatus, as described in S102. The feedback information for the first frame further includes information about a receive sector, of the response apparatus, that is aligned with the transmit sector of the sending apparatus, as described in S102. The feedback information for the first frame further includes an SNR value of receiving the first frame by the response apparatus in an aligned receive sector.

In FIG. 3, two response apparatuses are used as an example. As shown in FIG. 3, the response apparatus 1 sends a feedback frame 1 to the sending apparatus at a time resource that is indicated by the first frame and at which the response apparatus 1 sends feedback information for the first frame to the sending apparatus. The response apparatus 2 sends a feedback frame 2 to the sending apparatus at a time resource that is indicated by the first frame and at which the response apparatus 2 sends feedback information for the first frame to the sending apparatus.

S105. The sending apparatus receives the feedback information for the first frame.

In S105, the sending apparatus receives at least one feedback frame sent by the at least one response apparatus to the sending apparatus in S104. Specifically, the sending apparatus receives, at the time resource at which the corresponding response apparatus sends the feedback information for the first frame to the sending apparatus, the feedback frame sent by the corresponding response apparatus. The feedback frame includes the feedback information of the corresponding response apparatus for the first frame. The sending apparatus can obtain a beam training result of the corresponding response apparatus by using the feedback information for the first frame. For specific content of the feedback information for the first frame, refer to S104. Details are not described herein again. If the sending apparatus receives no feedback information for the first frame, it indicates that the transmit sector is not aligned with a receive sector.

S106. After receiving the feedback information for the first frame, the sending apparatus sends acknowledgment information for the feedback information to the corresponding response apparatus at a time resource that is indicated by the first frame and at which the sending apparatus sends the acknowledgment information for the feedback information to the corresponding response apparatus.

In S106, in a possible implementation, the sending apparatus sends an acknowledgment frame to the corresponding response apparatus at the time resource that is indicated by the first frame and at which the sending apparatus sends the acknowledgment information for the feedback information to the corresponding response apparatus. The acknowledgment frame includes the acknowledgment information for the feedback information. Specifically, the acknowledgment information for the feedback information includes information about a transmit sector in which the response apparatus sends the feedback frame, an SNR value of receiving the feedback frame by the sending apparatus, and other configuration information.

In FIG. 3, two response apparatuses are used as an example. As shown in FIG. 3, the sending apparatus sends an acknowledgment frame 1 to the response apparatus 1 at a time resource that is indicated by the first frame and at which the sending apparatus sends acknowledgment information to the response apparatus 1, and the sending apparatus sends an acknowledgment frame 2 to the response apparatus 2 at a time resource that is indicated by the first frame and at which the sending apparatus sends acknowledgment information to the response apparatus 2.

The sending apparatus may send acknowledgment frames to response apparatuses one by one after receiving feedback frames of all the response apparatuses, as shown in FIG. 3. Alternatively, the sending apparatus may send an acknowledgment frame to a corresponding response apparatus after receiving a feedback frame of the response apparatus, and then the sending apparatus receives a feedback frame of another response apparatus, and sends an acknowledgment frame to the corresponding response apparatus. This is not limited in this embodiment of this application. A time at which a response apparatus sends a feedback frame and a time at which the sending apparatus sends an acknowledgment frame are indicated by the first frame. Specifically, the sending apparatus may configure indication information of the first frame, and a response apparatus performs execution based on the indication information of the first frame.

In this embodiment of this application, the first frame used for beamforming scanning includes the at least one piece of sub-time resource indication information, each piece of sub-time resource indication information is in a one-to-one correspondence with one of the at least one response apparatus, the sending apparatus sends the first frame to the at least one response apparatus, and the at least one response apparatus sends, to the sending apparatus at the corresponding time resource indicated by the first frame, the feedback frame used for feeding back beamforming scanning information, so that the at least one response apparatus and the sending apparatus can simultaneously perform beamforming training, thereby improving effectiveness of beamforming training performed on the sending apparatus and the at least one response apparatus.

Further, in this embodiment of this application, when the destination indication field in the first frame used for beamforming scanning is the second-type value, the first frame includes the at least two sub-time resource indication fields, each of the sub-time resource indication fields is in a one-to-one correspondence with one of the at least two response apparatuses, the sending apparatus sends the first frame to the at least two response apparatuses, and the at least two response apparatuses send, to the sending apparatus at corresponding time resources indicated by the first frame, feedback frames used for feeding back beamforming scanning information, so that the at least two response apparatuses and the sending apparatus can simultaneously perform beamforming training, thereby improving effectiveness of beamforming training performed on the sending apparatus and the at least two response apparatuses.

Certainly, when the destination indication field in the first frame used for beamforming scanning is the second-type value, the first frame may alternatively include one sub-time resource indication field. An identifier subfield value of the sub-time resource indication field is an address of a response apparatus, and the sub-time resource indication field includes the identifier subfield (the address of the response apparatus), a time resource indication subfield used by the response apparatus corresponding to the identifier subfield to send feedback information for the first frame to the sending apparatus, and a time resource indication subfield used by the sending apparatus to send acknowledgment apparatus for the feedback information to the response apparatus corresponding to the identifier subfield.

In a second embodiment of this application, before the sending apparatus generates and sends the first frame that includes the time resource indication information, the sending apparatus generates and sends a second frame, where the second frame includes indication information used to indicate a sending time of the first frame, and the sending apparatus sends the first frame to the at least one response apparatus at the sending time, of the first frame, that is indicated by the indication information.

A difference between the second embodiment of this application and the foregoing embodiment of this application lies in that the second frame is a beamforming scanning frame that includes the indication information used to indicate the sending time of the first frame, and the sending apparatus serially sends a plurality of second frames in a time division manner in one transmit sector, so that the response apparatus separately receives the plurality of second frames by using different receive sectors. If all receive sectors of the response apparatus cannot receive the second frame that can be decoded, the response apparatus does not have a receive sector that can be aligned with the transmit sector of the sending apparatus. If a specific receive sector of the response apparatus receives the second frame that can be decoded, the response apparatus selects the receive sector as a receive sector aligned with the transmit sector of the sending apparatus. If a plurality of receive sectors of the response apparatus receive the second frame that can be decoded, the response apparatus selects a receive sector with strongest receive energy as a receive sector aligned with the transmit sector of the sending apparatus.

The second frame includes the indication information used to indicate the sending time of the first frame. Specifically, the second frame includes an indication field used to indicate the sending time of the first frame. In other words, the second frame in the second embodiment of this application is a beamforming scanning frame that includes the indication field used to indicate the sending time of the first frame.

After serially sending the plurality of second frames in a time division manner in one transmit sector, the sending apparatus sends, by using the same transmit sector at the sending time, of the first frame, that is indicated by the second frame, the first frame that includes the time resource indication information. Correspondingly, if the response apparatus can receive the second frame that can be decoded, the response apparatus further needs to receive, by using a receive sector that receives the second frame, the first frame at the sending time, of the first frame, that is indicated by the second frame, to obtain the at least one piece of sub-time resource indication information in the first frame. If the response apparatus cannot receive the second frame that can be decoded, the response apparatus does not have a receive sector that can be aligned with the transmit sector of the sending apparatus, and the response apparatus cannot receive the second frame sent by the sending apparatus in the transmit sector or the first frame sent by the sending apparatus in the transmit sector.

In the second embodiment of this application, the second frame is a beamforming scanning frame, to be specific, the sending apparatus serially sends the plurality of second frames in a time division manner in one transmit sector, and the response apparatus separately receives the plurality of second frames by using different receive sectors. In this way, beamforming scanning and alignment are performed between the sending apparatus and the response apparatus.

In the foregoing embodiment of this application, the first frame is a beamforming scanning frame, to be specific, the sending apparatus serially sends the plurality of first frames in a time division manner in one transmit sector, so that the response apparatus separately receives the plurality of first frames by using different receive sectors. In this way, beamforming scanning and alignment are performed between the sending apparatus and the response apparatus.

In the second embodiment of this application, the second frame includes only the indication field used to indicate the sending time of the first frame. In the foregoing embodiment of this application, the first frame includes the time resource indication field with a relatively large data volume. In the second embodiment of this application, a sum of overheads of serially sending, by the sending apparatus, the plurality of second frames in a time division manner in one transmit sector and overheads of sending, by the sending apparatus, only one first frame in one transmit sector is far less than overheads of serially sending, by the sending apparatus, the plurality of first frames in a time division manner in one transmit sector in the foregoing embodiment of this application.

Figure 5:
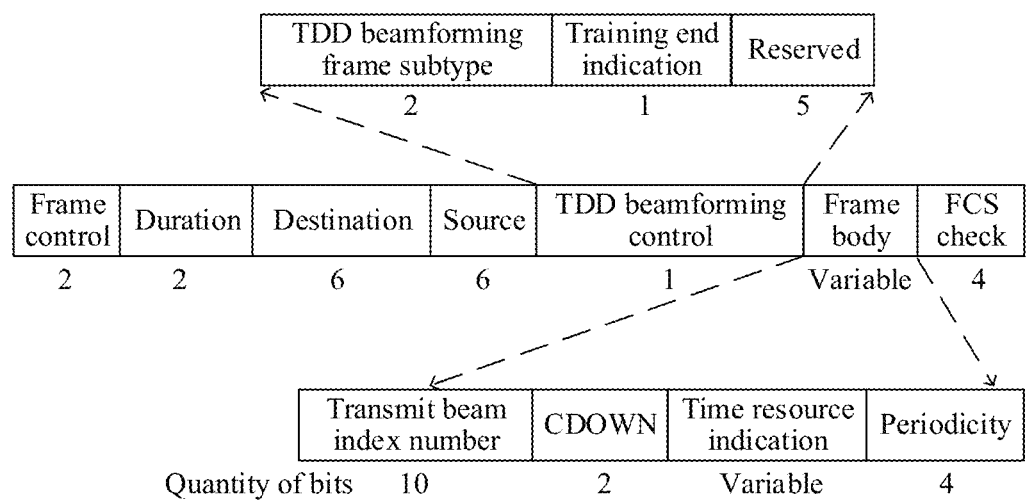
FIG. 5 is a schematic diagram of a frame structure of a TDD SSW-A frame.

In this embodiment of this application, in addition to distinguishing a structure of the first frame by using a value of the destination indication field, a TDD beamforming frame subtype field of the first frame may also be used to distinguish the structure of the first frame, as shown in FIG. 5.

The value of the destination indication field is used to distinguish the structure of the first frame. Specifically, when the destination indication field is the first-type value, the time resource indication field includes one sub-time resource indication field, where the sub-time resource indication field includes the time resource indication subfield used by the response apparatus corresponding to the identifier subfield to send the feedback information for the first frame to the sending apparatus, and/or the time resource indication subfield used by the sending apparatus to send the acknowledgment information for the feedback information to the response apparatus corresponding to the identifier subfield. When the destination indication field is the second-type value, the time resource indication field includes at least one sub-time resource indication field, and each sub-time resource indication field includes one or any combination of the following pieces of information: the identifier subfield used to identify one of the at least two response apparatuses, and the time resource indication subfield used by the response apparatus corresponding to the identifier subfield to send the feedback information for the first frame to the sending apparatus, or the time resource indication subfield used by the sending apparatus to send the acknowledgment information for the feedback information to the response apparatus corresponding to the identifier subfield.

As shown in FIG. 5, the TDD beamforming frame subtype field of the first frame is used to distinguish the structure of the first frame. Specifically, the subtype field has 2 bits. When the subtype field is 00, the time resource indication field includes one sub-time resource indication field, where the sub-time resource indication field includes the time resource indication subfield used by the response apparatus corresponding to the identifier subfield to send the feedback information for the first frame to the sending apparatus, and/or the time resource indication subfield used by the sending apparatus to send the acknowledgment information for the feedback information to the response apparatus corresponding to the identifier subfield. When the subtype field is 11, the time resource indication field includes at least one sub-time resource indication field, and each sub-time resource indication field includes one or any combination of the following pieces of information: the identifier subfield used to identify one of the at least two response apparatuses, and the time resource indication subfield used by the response apparatus corresponding to the identifier subfield to send the feedback information for the first frame to the sending apparatus, or the time resource indication subfield used by the sending apparatus to send the acknowledgment information for the feedback information to the response apparatus corresponding to the identifier subfield.

Certainly, a reserved bit in the first frame may also be used to distinguish the structure of the first frame.

The following provides two specific embodiments of this application.

Figure 4:
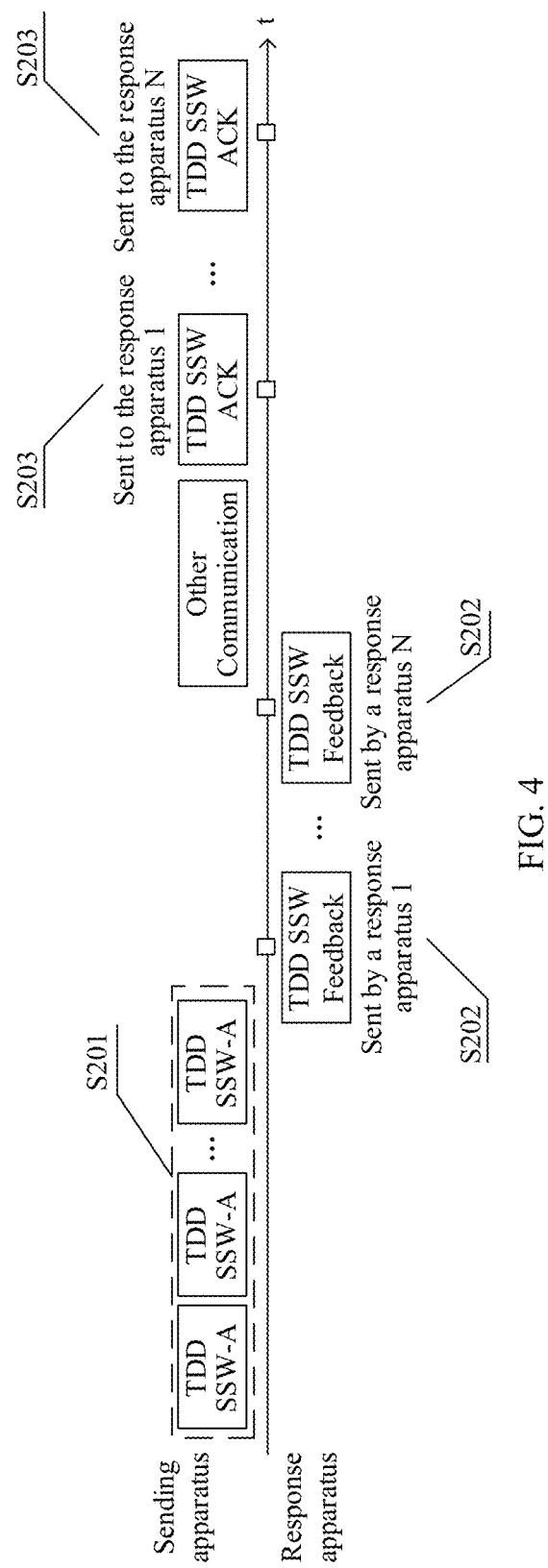
FIG. 4 is a schematic flowchart according to a first specific embodiment of this application.

FIG. 4 is a schematic flowchart according to a first specific embodiment of this application. As shown in FIG. 4, an information indication method includes the following steps.

S200. A sending apparatus generates a TDD SSW-A frame.

S200 is not shown in FIG. 4.

The TDD SSW-A frame generated by the sending apparatus is a beamforming scanning frame, and a frame structure of the TDD SSW-A frame is shown in FIG. 5. The TDD SSW-A frame includes a frame control field, a duration field, a destination indication field, a source indication field, a TDD beamforming control field, a frame body field, and an FCS check field. The frame body field includes a transmit beam index number, a CDOWN field, a time resource indication field with a variable length, and a periodictity field. The time resource indication field with a variable length is used to indicate a time resource at which at least one response apparatus sends feedback information for the first frame to the sending apparatus and a time resource at which the sending apparatus sends acknowledgment information for the feedback information to the at least one response apparatus. Particularly, when the destination indication field is a multicast address value or a broadcast address value, the time resource indication field with a variable length is used to indicate time resources at which at least two response apparatuses send feedback information for the first frame to the sending apparatus and time resources at which the sending apparatus sends acknowledgment information for the feedback information to the at least two response apparatuses.

Figure 6:
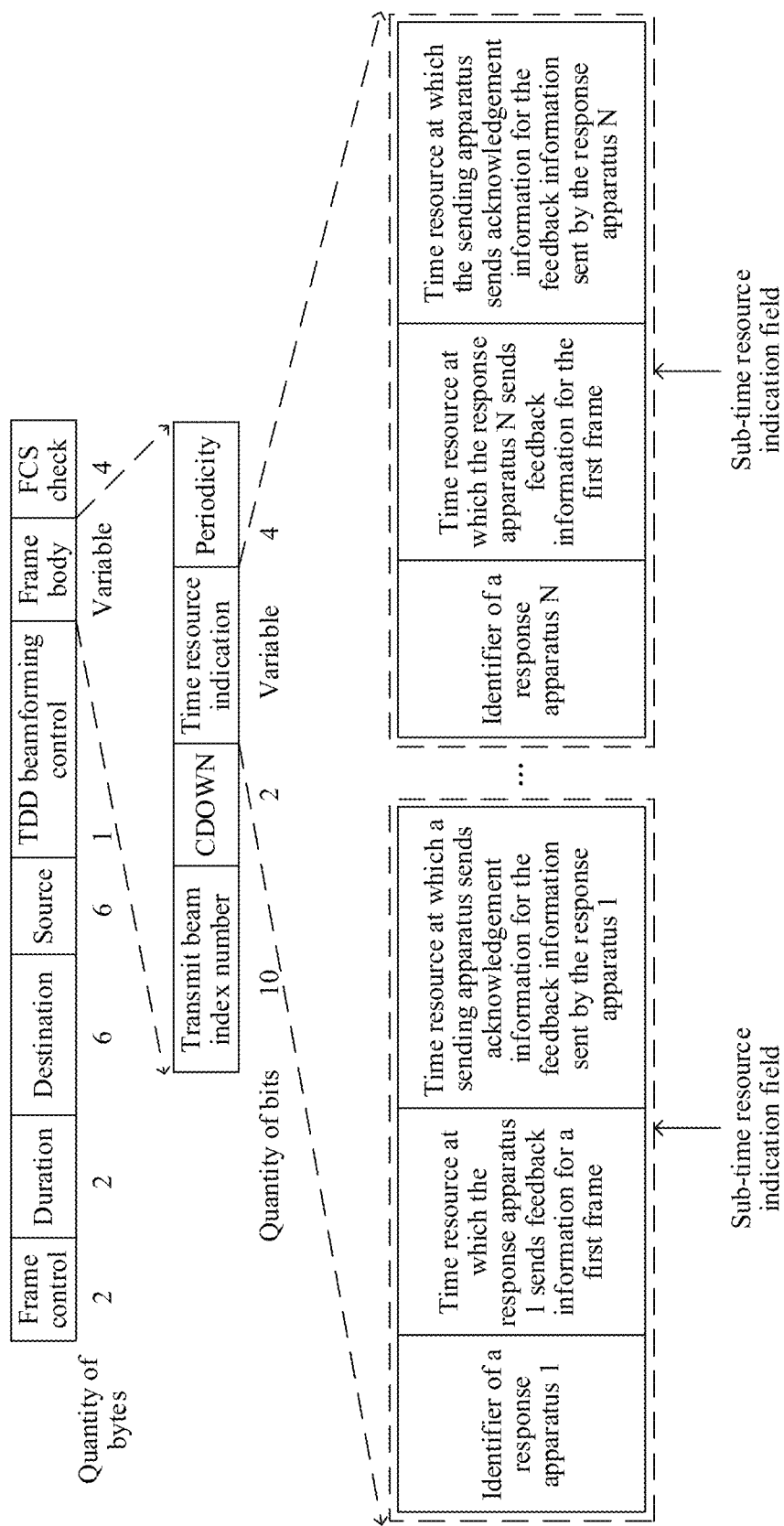
FIG. 6 is a schematic diagram of another frame structure of a TDD SSW-A frame.

Further, as shown in FIG. 6, the time resource indication field includes at least one sub-time resource indication field, and each sub-time resource indication field includes an identifier subfield used to identify one of the at least one response apparatus, and a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield.

Figure 19:
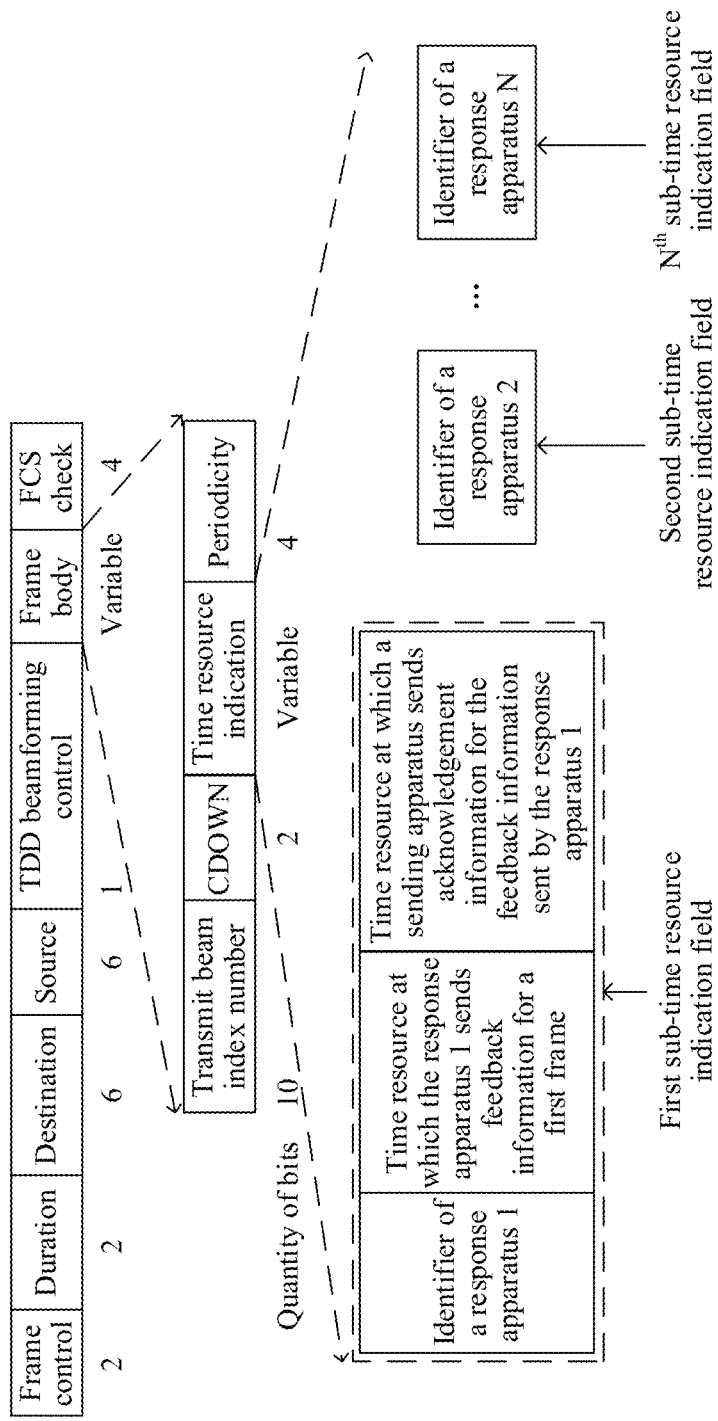
FIG. 19 is a schematic diagram of another frame structure of a TDD SSW-A frame.

Further, in another possible implementation, as shown in FIG. 19, the time resource indication field includes at least one sub-time resource indication field. A first sub-time resource indication field includes an identifier subfield used to identify one of the at least one response apparatus, and a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield. A second sub-time resource indication field, a third sub-time resource indication field, . . . , and an $N^{th}$ sub-time resource indication field each include only an identifier subfield used to identify one of the at least one response apparatus, but do not include a time resource indication subfield used by the response apparatus corresponding to the identifier subfield to send feedback information for the first frame to the sending apparatus and a time resource indication subfield used by the sending apparatus to send acknowledgment information for the feedback information to the response apparatus corresponding to the identifier subfield. Time resources of the second sub-time resource indication field, the third sub-time resource indication field, . . . , and the $N^{th}$ sub-time resource indication field are based on the time resource indication subfield used by the response apparatus corresponding to the identifier subfield to send the feedback information for the first frame to the sending apparatus and the time resource indication subfield used by the sending apparatus to send the acknowledgment information for the feedback information to the response apparatus corresponding to the identifier subfield in the first sub-time resource indication field.

For the first frames shown in FIG. 6 and FIG. 19, when a destination address value of the first frame is a second-type value, the time resource indication field in the first frame includes at least two sub-time resource indication fields.

Figure 7:
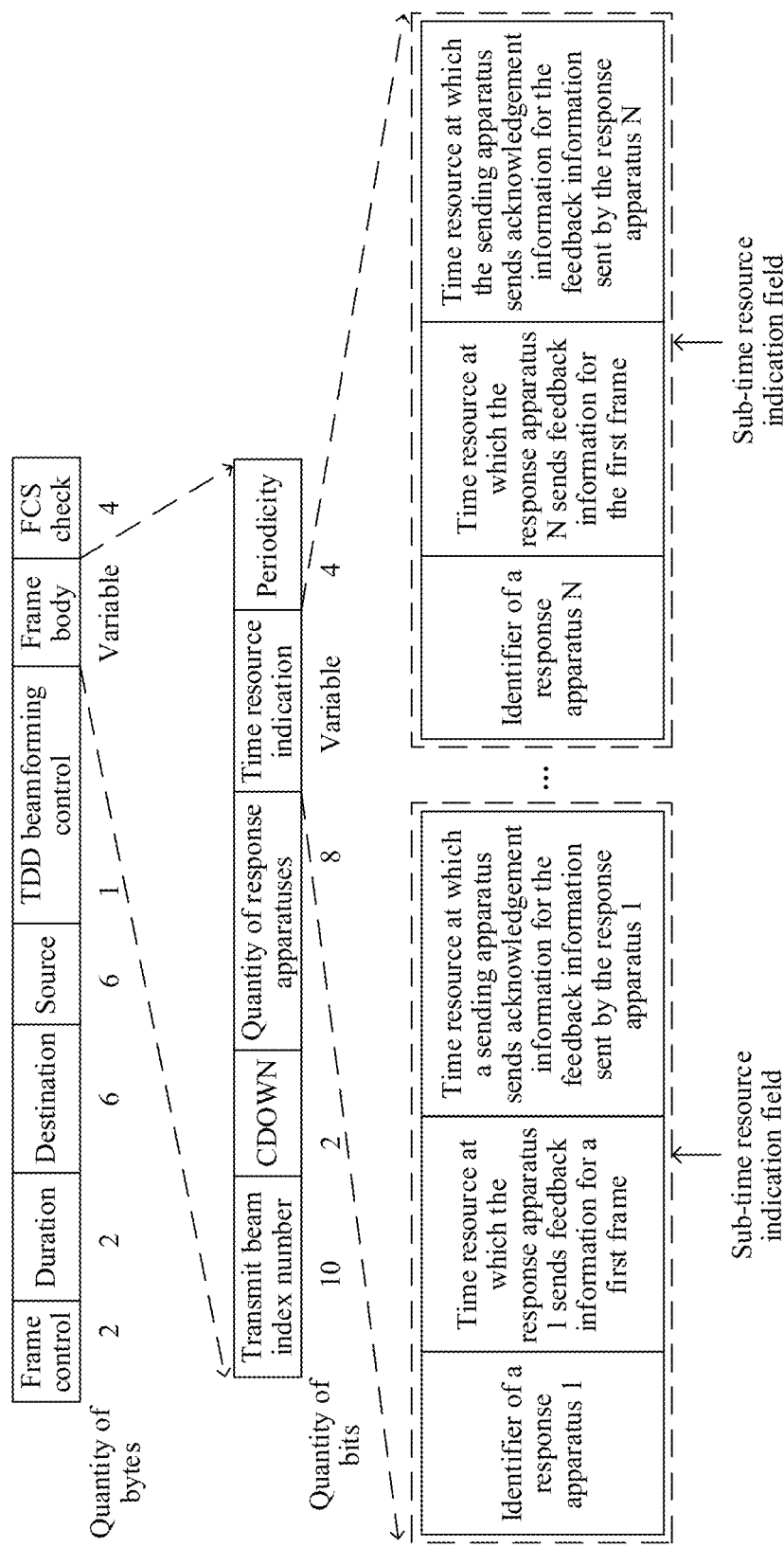
FIG. 7 is a schematic diagram of another frame structure of a TDD SSW-A frame.

Based on a TDD SSW-A frame structure shown in FIG. 6, further, in a possible implementation, as shown in FIG. 7, the TDD SSW-A frame further includes a response apparatus quantity field, and the response apparatus quantity field is used to indicate a quantity of at least two response apparatuses.

Figure 8:
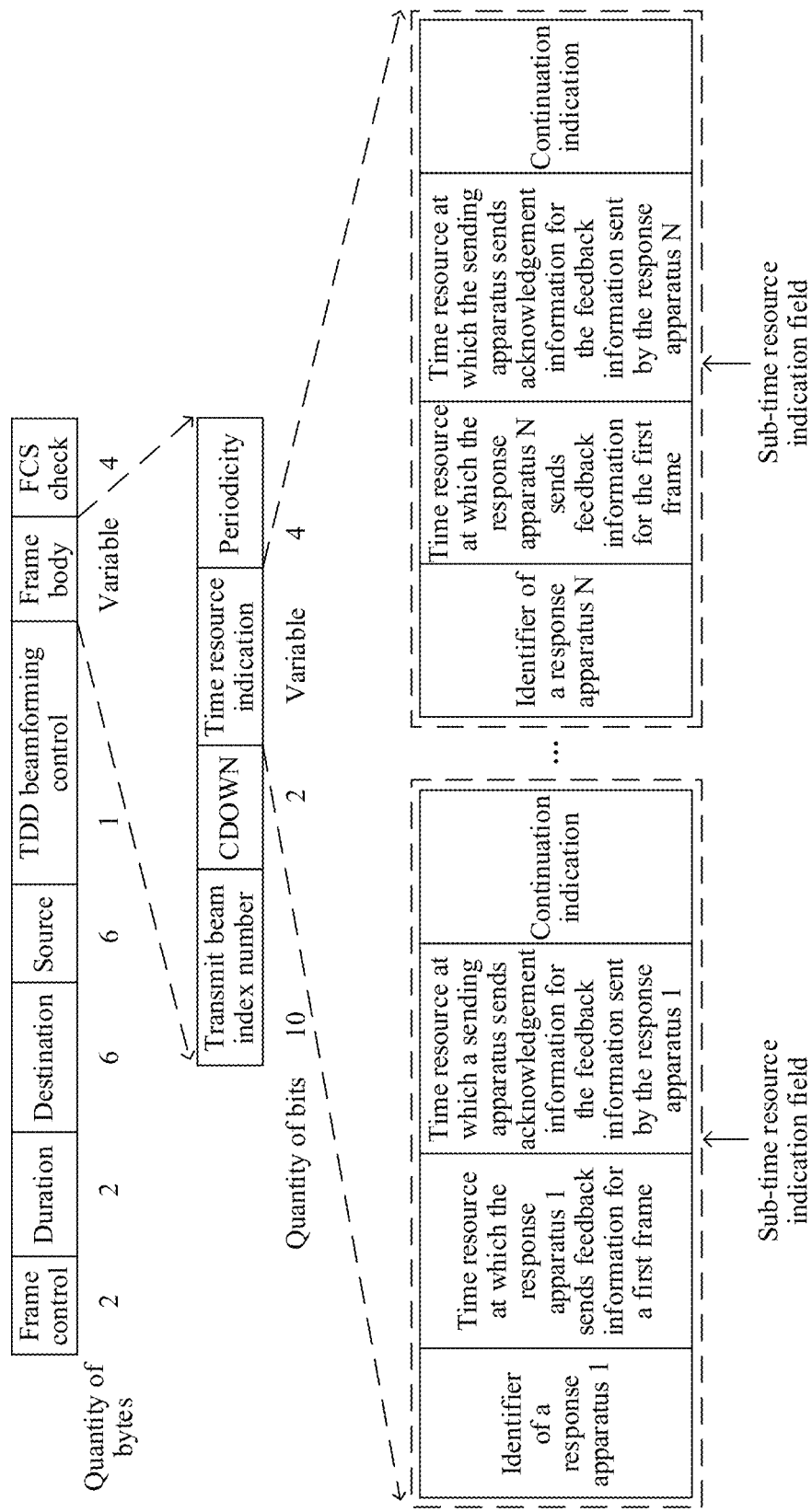
FIG. 8 is a schematic diagram of another frame structure of a TDD SSW-A frame.

Based on a TDD SSW-A frame structure shown in FIG. 6, further, in another possible implementation, as shown in FIG. 8, the sub-time resource indication field further includes a continuation indication subfield or an end indication subfield, the continuation indication subfield is used to indicate whether there is a next sub-time resource indication field in the first frame, and the end indication subfield is used to indicate whether the time resource indication field ends.

In the foregoing various TDD SSW-A frames, an identifier subfield of a response apparatus in a sub-time resource indication field is a MAC address of the response apparatus, an ID with a length that is obtained through calculation based on the MAC address and that is less than that of the MAC address, or a pre-allocated ID, for example, an 8-bit ID obtained through calculation based on a 48-bit MAC address by using an XX algorithm. Apparently, a smaller quantity of bits in the identifier subfield of the response apparatus leads to smaller overheads of the first frame.

S201. The sending apparatus sends the TDD SSW-A frame to at least one response apparatus.

In S201, the sending apparatus may send the TDD SSW-A frame to a response apparatus in a unicast manner. Specifically, the sending apparatus sends the TDD SSW-A frame whose destination indication field is a first-type value to a destination device, where the first-type value is an address of the destination device, for example, a MAC address of the destination device.

The sending apparatus may further send the TDD SSW-A frame to the at least one response apparatus in a broadcast or multicast manner. Specifically, the sending apparatus sends the TDD SSW-A frame whose destination indication field is a second-type value to a destination device, where the second-type value is a multicast address value or a broadcast address value. The destination indication field in the TDD SSW-A frame is the second-type value, and a time resource indication field in the TDD SSW-A frame includes at least one sub-time resource indication field, for example, includes one sub-time resource indication field, or includes two sub-time resource indication fields, or includes N sub-time resource indication fields.

The TDD SSW-A frame is a beamforming scanning frame, and the sending apparatus serially sends a plurality of TDD SSW-A frames in a time division manner in one transmit sector, so that the response apparatus separately receives the TDD SSW-A frames by using different receive sectors. In this way, beamforming scanning and alignment are performed between the sending apparatus and the response apparatus. Each of the at least one response apparatus separately receives the TDD SSW-A frames by using different receive sectors of the response apparatus. In this way, beamforming scanning and alignment are performed between the sending apparatus and each response apparatus. If all receive sectors of the response apparatus cannot receive the TDD SSW-A frame that can be decoded, the response apparatus does not have a receive sector that can be aligned with the transmit sector of the sending apparatus. If a specific receive sector of the response apparatus receives the TDD SSW-A frame that can be decoded, the response apparatus selects the receive sector as a receive sector aligned with the transmit sector of the sending apparatus. If a plurality of receive sectors of the response apparatus receive the TDD SSW-A frame that can be decoded, the response apparatus selects a receive sector with strongest receive energy as a receive sector aligned with the transmit sector of the sending apparatus.

S202. A response apparatus that receives the TDD SSW-A frame returns a TDD SSW feedback frame to the sending apparatus at a moment indicated by "a time resource indication subfield used by a response apparatus N to send feedback information for the first frame to the sending apparatus" in the TDD SSW-A frame.

In S202, for a condition of receiving the TDD SSW-A frame by the response apparatus, refer to S201. If the response apparatus has a receive sector that can be aligned with the transmit sector of the sending apparatus, the response apparatus can receive the TDD SSW-A frame.

As shown in FIG. 4, a response apparatus 1 that receives the TDD SSW-A frame returns a TDD SSW feedback frame to the sending apparatus at a moment indicated by "a time resource indication subfield used by the response apparatus 1 to send feedback information for the first frame" in the TDD SSW-A frame, and the response apparatus N that receives the TDD SSW-A frame returns the TDD SSW feedback frame to the sending apparatus at the moment indicated by "the time resource indication subfield used by the response apparatus N to send the feedback information for the first frame" in the TDD SSW-A frame.

Figure 9:
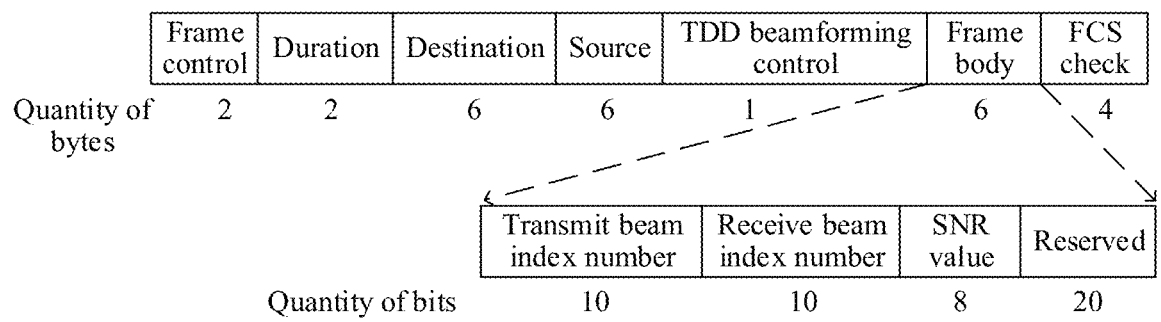
FIG. 9 is a schematic diagram of a frame structure of a TDD SSW feedback frame.

The TDD SSW feedback frame is used by the response apparatus to return feedback information for the TDD SSW-A frame to the sending apparatus. As shown in FIG. 9, the TDD SSW feedback frame includes a frame control field, a duration field, a destination indication field, a source indication field, a TDD beamforming control field, a frame body field, and an FCS check field, and the frame body field includes an index number of a transmit beam used by a sending apparatus to send the TDD SSW-A frame, an index number of a receive beam used by a response apparatus to receive the TDD SSW-A frame, an SNR value of receiving the TDD SSW-A frame by the response apparatus, and a reserved bit.

Transmit/receive beam reciprocity exists between the sending apparatus and the response apparatus. The response apparatus that receives the TDD SSW-A frame sends the TDD SSW feedback frame to the sending apparatus by using a beam that is used to receive the TDD SSW-A frame, and the sending apparatus receives the TDD SSW feedback frame by using a beam that is used to send the TDD SSW-A frame.

S203. The sending apparatus that receives the TDD SSW feedback frame sends a TDD SSW ACK frame to the response apparatus N at a moment indicated by "a time resource indication subfield used by the sending apparatus to send acknowledgment information for the feedback information to the response apparatus N" in the TDD SSW-A frame.

As shown in FIG. 4, the sending apparatus sends a TDD SSW ACK frame to the response apparatus 1 at a moment indicated by "a time resource indication subfield used by the sending apparatus to send acknowledgment information for the feedback information to the response apparatus 1" in the TDD SSW-A frame, and the sending apparatus sends the TDD SSW ACK frame to the response apparatus N at the moment indicated by "the time resource indication subfield used by the sending apparatus to send the acknowledgment information for the feedback information to the response apparatus N" in the TDD SSW-A frame.

Figure 10:
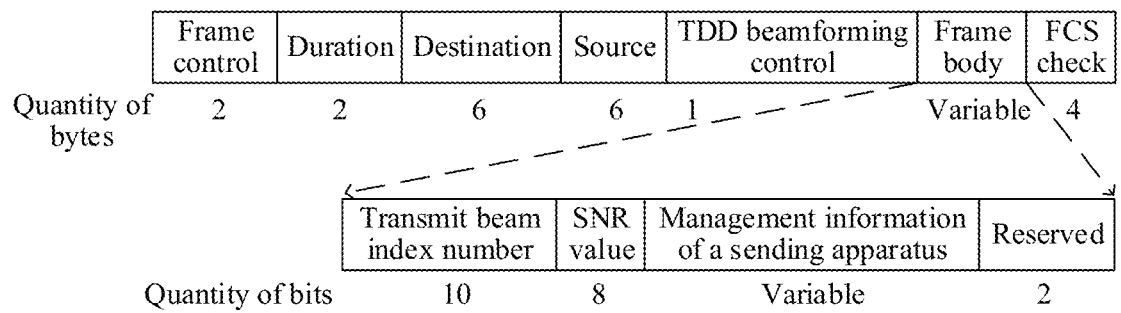
FIG. 10 is a schematic diagram of a frame structure of a TDD SSW ACK frame.

The TDD SSW ACK frame is used by the sending apparatus to send acknowledgment information for the TDD SSW feedback frame to the response apparatus. As shown in FIG. 10, the TDD SSW ACK frame includes an index number of a transmit beam used by a response apparatus to send a TDD SSW feedback frame, an SNR value of receiving the TDD SSW feedback frame by a sending apparatus, a reserved bit, and some other information.

The response apparatus returns the TDD SSW feedback frame at the moment indicated by "the time resource indication subfield used by the response apparatus N to send the feedback information for the first frame to the sending apparatus" in the TDD SSW-A frame. The sending apparatus sends the TDD SSW ACK frame at the moment indicated by "the time resource indication subfield used by the sending apparatus to send the acknowledgment information for the feedback information to the response apparatus N" in the TDD SSW-A frame. The sending apparatus and the response apparatus can perform other communication within a period from the moment indicated by "the time resource indication subfield used by the response apparatus N to send the feedback information for the first frame to the sending apparatus" to the moment indicated by "the time resource indication subfield used by the sending apparatus to send the acknowledgment information for the feedback information to the response apparatus N", as shown in FIG. 4, this embodiment of this application sets no limitation thereto.

In the foregoing first specific embodiment of this application, the TDD SSW-A frame includes at least one sub-time resource indication field, and each sub-time resource indication field is in a one-to-one correspondence with one of the at least one response apparatus. The sending apparatus sends the TDD SSW-A frame to the at least one response apparatus, and the at least one response apparatus sends a TDD SSW feedback frame to the sending apparatus at a corresponding moment indicated by the TDD SSW-A frame, so that the at least one response apparatus and the sending apparatus can simultaneously perform beamforming training, thereby improving effectiveness of beamforming training performed on the sending apparatus and the at least one response apparatus.

Further, the sending apparatus sends a TDD SSW ACK frame to the response apparatus at a corresponding moment indicated by the TDD SSW-A frame, to further confirm the TDD SSW feedback frame, and further improve a beamforming training process between the sending apparatus and the at least one response apparatus.

The following provides a second specific embodiment of this application.

A difference between the second specific embodiment of this application and the foregoing first specific embodiment of this application lies in that a TDD SSW-B frame is a beamforming scanning frame and includes indication information used to indicate a sending time of the TDD SSW schedule frame, and "time resource indication information used to instruct at least one response apparatus to send feedback information for the first frame to the sending apparatus and time resource indication information used by the sending apparatus to send acknowledgment information for the feedback information to the at least one response apparatus" are carried in the TDD SSW schedule frame.

Figure 11:
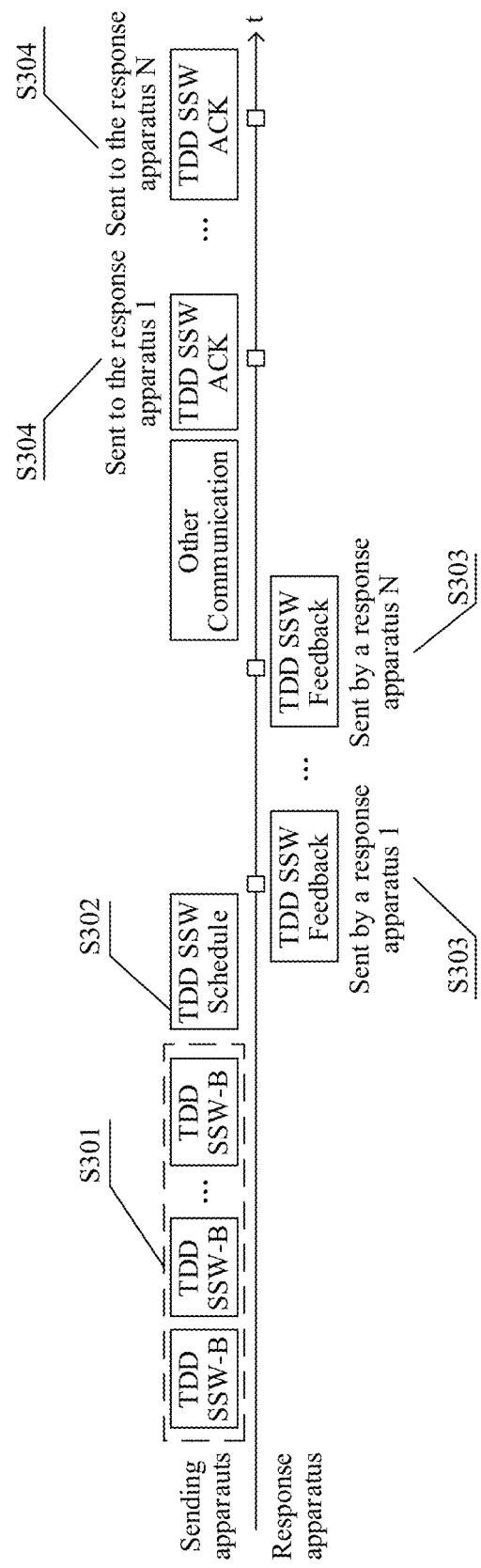
FIG. 11 is a schematic flowchart according to a second specific embodiment of this application.

FIG. 11 is a schematic flowchart according to a second specific embodiment of this application. As shown in FIG. 11, an information indication method includes the following steps.

S300. A sending apparatus generates a TDD SSW-B frame and a TDD SSW schedule frame.

S300 is not shown in FIG. 11.

The TDD SSW-B frame generated by the sending apparatus is a beamforming scanning frame, and a difference between the TDD SSW-B frame and a TDD SSW-A frame lies in that:

1. The TDD SSW-B frame includes indication information used to indicate a sending time of the TDD SSW schedule frame, but does not include time resource indication information used to instruct at least one response apparatus to send feedback information for the first frame to the sending apparatus and time resource indication information used by the sending apparatus to send acknowledgment information for the feedback information to the at least one response apparatus. "The time resource indication information used to instruct the at least one response apparatus to send the feedback information for the first frame to the sending apparatus and the time resource indication information used by the sending apparatus to send the acknowledgment information for the feedback information to the at least one response apparatus" are carried in the TDD SSW schedule frame.

2. The TDD SSW-A frame in the first specific embodiment of this application directly includes time resource indication information used to instruct at least one response apparatus to send feedback information for the first frame to the sending apparatus and time resource indication information used by the sending apparatus to send acknowledgment information for the feedback information to the at least one response apparatus.

Figure 12:
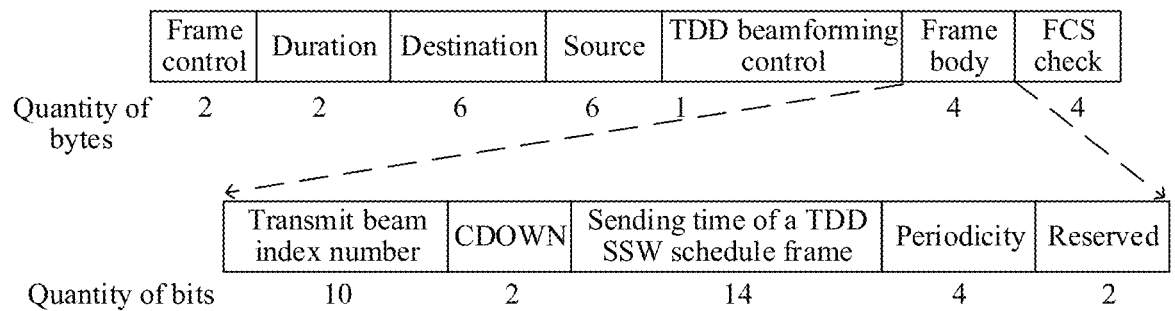
FIG. 12 is a schematic diagram of a frame structure of a TDD SSW-B frame.

A frame structure of the TDD SSW-B frame is shown in FIG. 12, the TDD SSW-B frame includes a frame control field, a duration field, a destination indication field, a source indication field, a TDD beamforming control field, a frame body field, and an FCS check field, and the frame body field includes an index number of a transmit beam used by the sending apparatus to send the TDD SSW-B frame, a CDOWN field, a TDD SSW schedule frame sending time indication field, a periodictity field, and a reserved field.

A frame structure of the TDD SSW schedule frame is the same as the frame structure of the TDD SSW-A frame in the first specific embodiment of this application, and details are not described herein again.

S301. The sending apparatus sends the TDD SSW-B frame to at least one response apparatus.

In S301, the TDD SSW-B frame is a beamforming scanning frame that includes the indication information used to indicate the sending time of the TDD SSW schedule frame, and the sending apparatus serially sends a plurality of TDD SSW-B frames in a time division manner in one transmit sector, so that the response apparatus separately receives the TDD SSW-B frames by using different receive sectors. In this way, beamforming scanning and alignment are performed between the sending apparatus and the response apparatus. Each of the at least one response apparatus separately receives the TDD SSW-B frames by using different receive sectors of the response apparatus. In this way, beamforming scanning and alignment are performed between the sending apparatus and each response apparatus. If all receive sectors of the response apparatus cannot receive the TDD SSW-B frame that can be decoded, the response apparatus does not have a receive sector that can be aligned with the transmit sector of the sending apparatus. If a specific receive sector of the response apparatus receives the TDD SSW-B frame that can be decoded, the response apparatus selects the receive sector as a receive sector aligned with the transmit sector of the sending apparatus. If a plurality of receive sectors of the response apparatus receive the TDD SSW-B frame that can be decoded, the response apparatus selects a receive sector with strongest receive energy as a receive sector aligned with the transmit sector of the sending apparatus.

A response apparatus aligned with the transmit sector of the sending apparatus receives the TDD SSW-B frame, and obtains, by using the TDD SSW schedule frame sending time indication field in the TDD SSW-B frame, the time at which the sending apparatus sends the TDD SSW schedule frame, the sending apparatus sends the TDD SSW schedule frame by using the same transmit sector, and the response apparatus receives the TDD SSW schedule frame by using the same receive sector. The TDD SSW schedule frame carries "the time resource indication information used to instruct the at least one response apparatus to send the feedback information for the first frame to the sending apparatus and the time resource indication information used by the sending apparatus to send the acknowledgment information for the feedback information to the at least one response apparatus", and the response apparatus obtains corresponding information.

S302. The sending apparatus sends the TDD SSW schedule frame to the at least one response apparatus.

In S302, as described in S301, the sending apparatus sends the TDD SSW schedule frame to the at least one response apparatus at a moment indicated by the TDD SSW schedule frame sending time indication field in the TDD SSW-B frame.

S303. A response apparatus that receives the TDD SSW schedule frame returns a TDD SSW feedback frame to the sending apparatus at a moment indicated by "a time resource indication subfield used by a response apparatus N to send feedback information for the first frame to the sending apparatus" in the TDD SSW schedule frame.

S304. The sending apparatus that receives the TDD SSW feedback frame sends a TDD SSW ACK frame to the response apparatus N at a moment indicated by "a time resource indication subfield used by the sending apparatus to send acknowledgment information for the feedback information to the response apparatus N" in the TDD SSW schedule frame.

S303 is similar to S202, and S304 is similar to S203. Details are not described herein again.

In the second specific embodiment of this application, a quantity of bits of the beamforming scanning frame, namely, the TDD SSW-B frame, that includes the indication information used to indicate the sending time of the TDD SSW schedule frame is far less than that of the beamforming scanning frame, namely, the TDD SSW-A frame, in the first specific embodiment of this application. A process of beamforming scanning is as follows: A sending apparatus serially sends a plurality of beamforming scanning frames in a time division manner in one transmit sector, so that a response apparatus separately receives the beamforming scanning frames by using different receive sectors. When the quantity of bits of the TDD SSW-B frame is far less than that of the TDD SSW-A frame, a sum of overheads of serially sending, by the sending apparatus, the plurality of TDD SSW-B frames in a time division manner in one transmit sector and overheads of sending, by the sending apparatus, only one TDD SSW schedule frame in one transmit sector is far less than overheads of serially sending, by the sending apparatus, a plurality of TDD SSW-A frames in a time division manner in one transmit sector. For clarity, FIG. 4 and FIG. 11 may be compared to obtain the conclusion in this paragraph.

An embodiment of this application further provides a sending apparatus. It should be understood that the sending apparatus in this embodiment of this application has any function of the sending apparatus in the foregoing methods.

Figure 13:
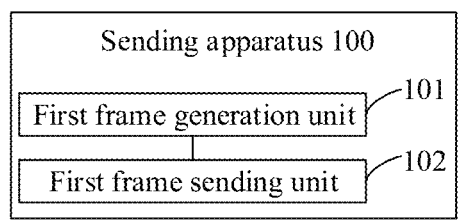
FIG. 13 is a schematic structural diagram of a sending apparatus according to an embodiment of this application.

FIG. 13 is a schematic structural diagram of a sending apparatus according to an embodiment of this application. As shown in FIG. 13, a sending apparatus includes:

a first frame generation unit 101, configured to generate a first frame, where the first frame includes time resource indication information; and a first frame sending unit 102, configured to send the first frame to at least one response apparatus, where the time resource indication information includes at least one piece of sub-time resource indication information, each piece of sub-time resource indication information is in a one-to-one correspondence with one of the at least one response apparatus, and each piece of sub-time resource indication information includes a time resource at which the corresponding response apparatus sends feedback information for the first frame to the sending apparatus and a time resource at which the sending apparatus sends acknowledgment information for the feedback information to the corresponding response apparatus.

In this embodiment of this application, the first frame that is generated and sent by the sending apparatus and that is used for beamforming scanning includes the at least one piece of sub-time resource indication information, each piece of sub-time resource indication information is in a one-to-one correspondence with one of the at least one response apparatus, the sending apparatus sends the first frame to the at least one response apparatus, and the at least one response apparatus sends, to the sending apparatus at a corresponding time resource indicated by the first frame, a feedback frame used for feeding back beamforming scanning information, so that the at least one response apparatus and the sending apparatus can simultaneously perform beamforming training, thereby improving effectiveness of beamforming training performed on the sending apparatus and the at least one response apparatus.

Further, in this embodiment of this application, when a destination indication field in the first frame used for beamforming scanning is a second-type value, the first frame includes at least two sub-time resource indication fields, each of the sub-time resource indication fields is in a one-to-one correspondence with one of at least two response apparatuses, the sending apparatus sends the first frame to the at least two response apparatuses, and the at least two response apparatuses send, to the sending apparatus at corresponding time resources indicated by the first frame, feedback frames used for feeding back beamforming scanning information, so that the at least two response apparatuses and the sending apparatus can simultaneously perform beamforming training, thereby improving effectiveness of beamforming training performed on the sending apparatus and the at least two response apparatuses.

Based on the foregoing sending apparatus, an embodiment of this application further provides another sending apparatus. It should be understood that the sending apparatus in this embodiment of this application has any function of the sending apparatus in the foregoing methods.

Figure 14:
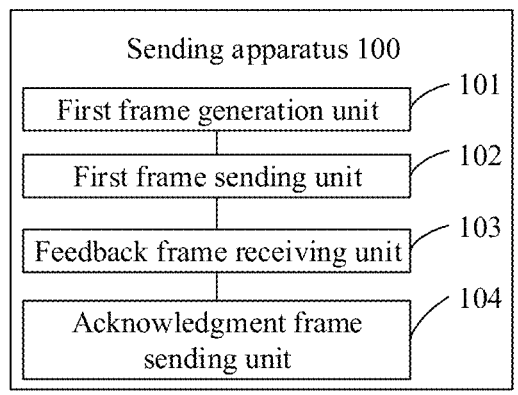
FIG. 14 is a schematic structural diagram of another sending apparatus according to an embodiment of this application.

FIG. 14 is a schematic structural diagram of another sending apparatus according to an embodiment of this application. As shown in FIG. 14, a sending apparatus includes:

a first frame generation unit 101 and a first frame sending unit 102, where functions of the first frame generation unit 101 and the first frame sending unit 102 are the same as those described in the foregoing embodiment, and details are not described herein again;

a feedback frame receiving unit 103, configured to receive, at the time resource at which the corresponding response apparatus sends the feedback information for the first frame to the sending apparatus, a feedback frame sent by the corresponding response apparatus, where the feedback frame includes the feedback information of the corresponding response apparatus for the first frame; and an acknowledgment frame sending unit 104, configured to send an acknowledgment frame to the corresponding response apparatus at the time resource at which the sending apparatus sends the acknowledgment information for the feedback information to the corresponding response apparatus, where the acknowledgment frame includes the acknowledgment information for the feedback information.

Figure 15:
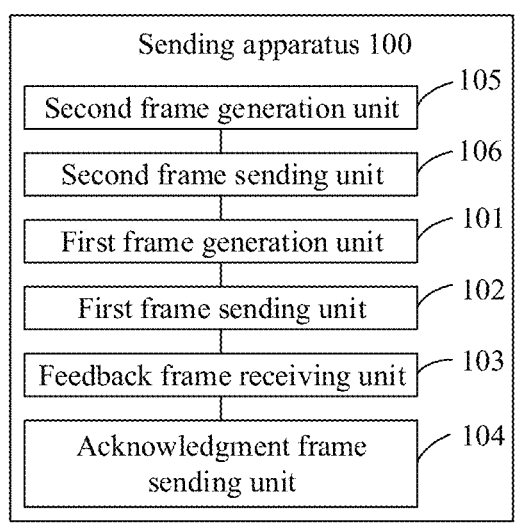
FIG. 15 is a schematic structural diagram of another sending apparatus according to an embodiment of this application.

Based on the sending apparatus shown in FIG. 14, an embodiment of this application further provides another sending apparatus shown in FIG. 15. The following units are added to the sending apparatus shown in FIG. 15 based on the sending apparatus shown in FIG. 14:

a second frame generation unit 105, configured to generate a second frame, where the second frame includes indication information used to indicate a sending time of the first frame; and a second frame sending unit 106, configured to send the second frame to the at least one response apparatus.

An embodiment of this application further provides a response apparatus. It should be understood that the response apparatus in this embodiment of this application has any function of the response apparatus in the foregoing methods.

Figure 16:
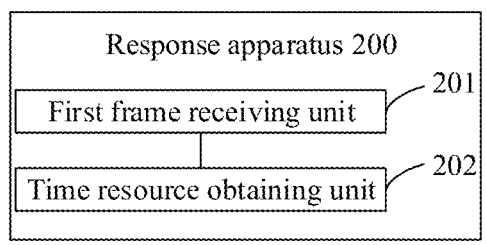
FIG. 16 is a schematic structural diagram of a response apparatus according to an embodiment of this application.

FIG. 16 is a schematic structural diagram of a response apparatus according to an embodiment of this application. As shown in FIG. 16, a response apparatus includes:

a first frame receiving unit 201, configured to receive a first frame, where the first frame includes time resource indication information, the time resource indication information includes at least one piece of sub-time resource indication information, each piece of sub-time resource indication information is in a one-to-one correspondence with one of at least one response apparatus, and each piece of sub-time resource indication information includes a time resource at which the corresponding response apparatus sends feedback information for the first frame to a sending apparatus and a time resource at which the sending apparatus sends acknowledgment information for the feedback information to the corresponding response apparatus; and a time resource obtaining unit 202, configured to obtain, based on the first frame, a time resource at which the response apparatus sends feedback information for the first frame to the sending apparatus and a time resource at which the sending apparatus sends acknowledgment information for the feedback information to the response apparatus.

In this embodiment of this application, the first frame that is generated and sent by the sending apparatus and that is used for beamforming scanning includes the at least one piece of sub-time resource indication information, each piece of sub-time resource indication information is in a one-to-one correspondence with one of the at least one response apparatus, the sending apparatus sends the first frame to the at least one response apparatus, and the at least one response apparatus sends, to the sending apparatus at a corresponding time resource indicated by the first frame, a feedback frame used for feeding back beamforming scanning information, so that the at least one response apparatus and the sending apparatus can simultaneously perform beamforming training, thereby improving effectiveness of beamforming training performed on the sending apparatus and the at least one response apparatus.

Further, in this embodiment of this application, when a destination indication field in the first frame used for beamforming scanning is a second-type value, the first frame includes at least two sub-time resource indication fields, each of the sub-time resource indication fields is in a one-to-one correspondence with one of at least two response apparatuses, the sending apparatus sends the first frame to the at least two response apparatuses, and the at least two response apparatuses send, to the sending apparatus at corresponding time resources indicated by the first frame, feedback frames used for feeding back beamforming scanning information, so that the at least two response apparatuses and the sending apparatus can simultaneously perform beamforming training, thereby improving effectiveness of beamforming training performed on the sending apparatus and the at least two response apparatuses.

Figure 17:
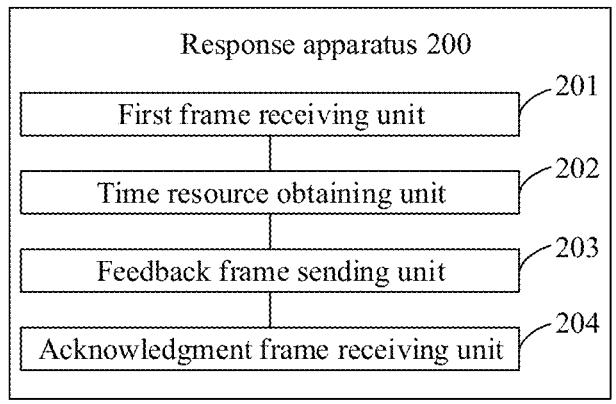
FIG. 17 is a schematic structural diagram of another response apparatus according to an embodiment of this application.

Based on the response apparatus shown in FIG. 16, an embodiment of this application further provides another response apparatus shown in FIG. 17. The following units are added to the response apparatus shown in FIG. 17 based on the response apparatus shown in FIG. 16:

a feedback frame sending unit 203, configured to send a feedback frame to the sending apparatus at the time resource at which the response apparatus sends the feedback information for the first frame to the sending apparatus, where the feedback frame includes the feedback information of the corresponding response apparatus for the first frame; and an acknowledgment frame receiving unit 204, configured to receive, at the time resource at which the sending apparatus sends the acknowledgment information for the feedback information to the corresponding response apparatus, an acknowledgment frame sent by the sending apparatus, where the acknowledgment frame includes the acknowledgment information for the feedback information.

An embodiment of this application further provides another response apparatus, and the following unit is added based on the response apparatus shown in FIG. 17:

a second frame receiving unit, configured to receive a second frame, where the second frame includes indication information used to indicate a sending time of the first frame.

Referring back to FIG. 2, the foregoing sending apparatus is the sending apparatus 100 in FIG. 2, and the foregoing response apparatus is any response apparatus in FIG. 2, for example, the response apparatus 201, the response apparatus 202, the response apparatus 203, the response apparatus 204, and the response apparatus 205.

Figure 18:
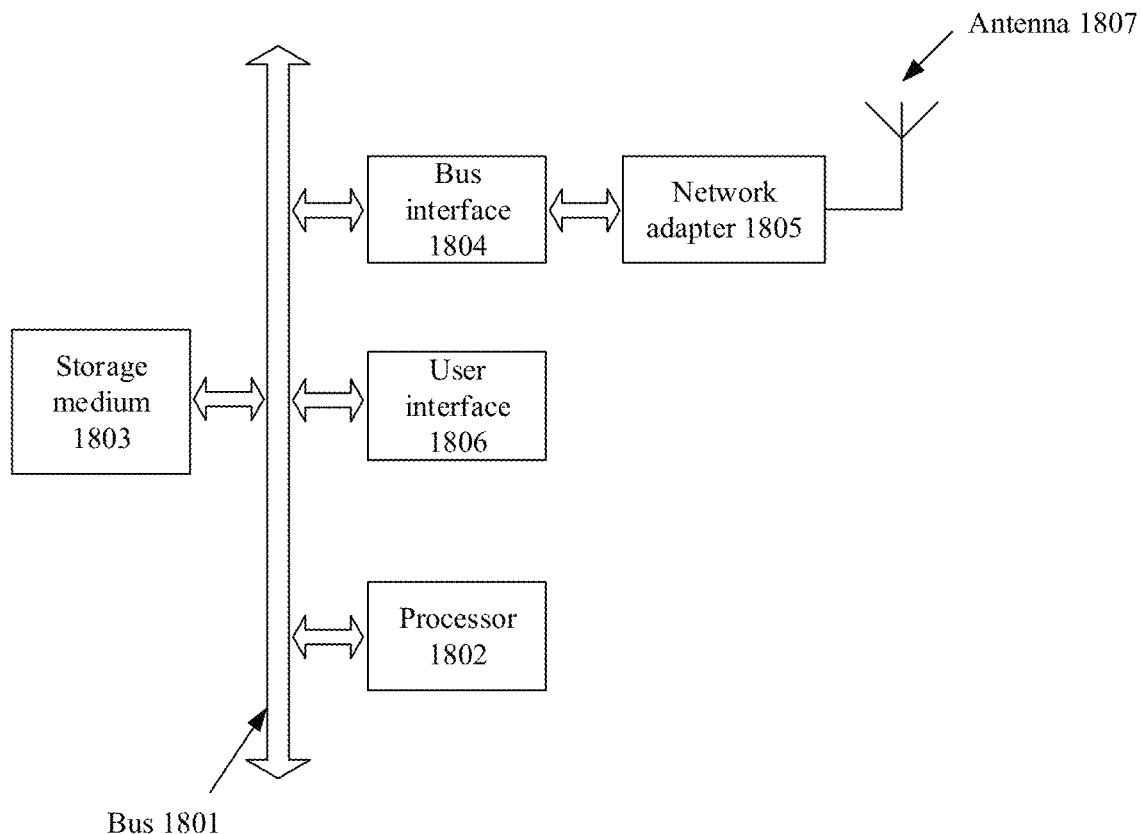
FIG. 18 shows a plurality of other product forms of a sending apparatus or a response apparatus according to an embodiment of this application.

In addition to the foregoing product forms, the sending apparatus and the response apparatus described in this application may further have the following product forms:

FIG. 18 shows a plurality of other product forms of a sending apparatus or a response apparatus according to an embodiment of this application. As shown in FIG. 18, in a possible product form, the sending apparatus or the response apparatus may be implemented by using a bus 1801 as a general bus architecture. As shown in FIG. 18, the bus 1801 may include any quantity of interconnected buses and bridges based on specific application and an overall design constraint condition of the sending apparatus or the response apparatus. The bus 1801 interconnects various circuits, and the circuits include a processor 1802, a storage medium 1803, a bus interface 1804, and a user interface 1806.

The sending apparatus or the response apparatus connects a network adapter 1805 and the like through the bus interface 1804 by using the bus 1801. The network adapter 1805 may be configured to implement a signal processing function of a physical layer in a wireless local area network, and send and receive radio frequency signals by using an antenna 1807. In this application, the antenna 1807 is configured to implement various information receiving and sending that are performed by the sending apparatus or the response apparatus in the foregoing method embodiments.

The user interface 1806 may connect to a user terminal, for example, a keyboard, a display, a mouse, or a joystick. The bus 1801 may further connect to various other circuits, for example, a timing source, a peripheral device, a voltage regulator, and a power management circuit. These circuits are well-known in the art, and are not described in detail herein.

The processor 1802 is responsible for bus management and general processing (including executing software stored in the storage medium 1803). The processor 1802 may be implemented by using one or more general purpose processors and/or dedicated processors. Examples of the processor include a microprocessor, a microcontroller, a DSP, and other circuits that can execute software. Software should be broadly interpreted as instructions, data, or any combination thereof, regardless of whether the software is referred to as software, firmware, middleware, microcode, hardware description language, or the like, in this application, the processor 1802 is configured to implement all processing performed by a first communications apparatus in the foregoing method embodiments except various information receiving and sending.

In addition, the storage medium 1803 is separated from the processor 1802 in FIG. 18. However, a person skilled in the art can easily understand that the storage medium 1803 or any part thereof may be located outside the sending apparatus or the response apparatus. For example, the storage medium 1803 may include a transmission line, a carrier waveform modulated by using data, and/or a computer product separated from a wireless node. All these media are accessible to the processor 1802 through the bus interface 1804. Alternatively, the storage medium 1803 or any part thereof may be integrated into the processor 1802, for example, may be a cache and/or a general register. In this application, the storage medium 1803 is configured to store a computer program, and the computer program is executed by the processor 1802 to implement all processing performed by the processor 1802.

In another possible product form, the sending apparatus or the response apparatus may be configured as a general purpose processing system. For example, the general purpose processing system is usually referred to as a chip. The general purpose processing system includes one or more microprocessors that provide a processor function and an external memory that provides at least a part of the storage medium 1803. All these components are connected to other supporting circuits by using an external bus architecture structure.

In another possible product form, the sending apparatus or the response apparatus may also be implemented by using an application-specific integrated circuit (ASIC) having a processor 1802, a bus interface 1804, and a user interface 1806, and at least a part of the storage medium 1803 integrated in a single chip.

In another possible product form, the sending apparatus or the response apparatus may also be implemented by using one or more field-programmable gate arrays (FPGA), a programmable logic device (PLD), a controller, a state machine, a gate logic, a discrete hardware component, any other appropriate circuit, or any combination of circuits that can implement various functions described in this application.

All or some of the foregoing embodiments of this application may be implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable medium to another computer readable medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

Figure 20:
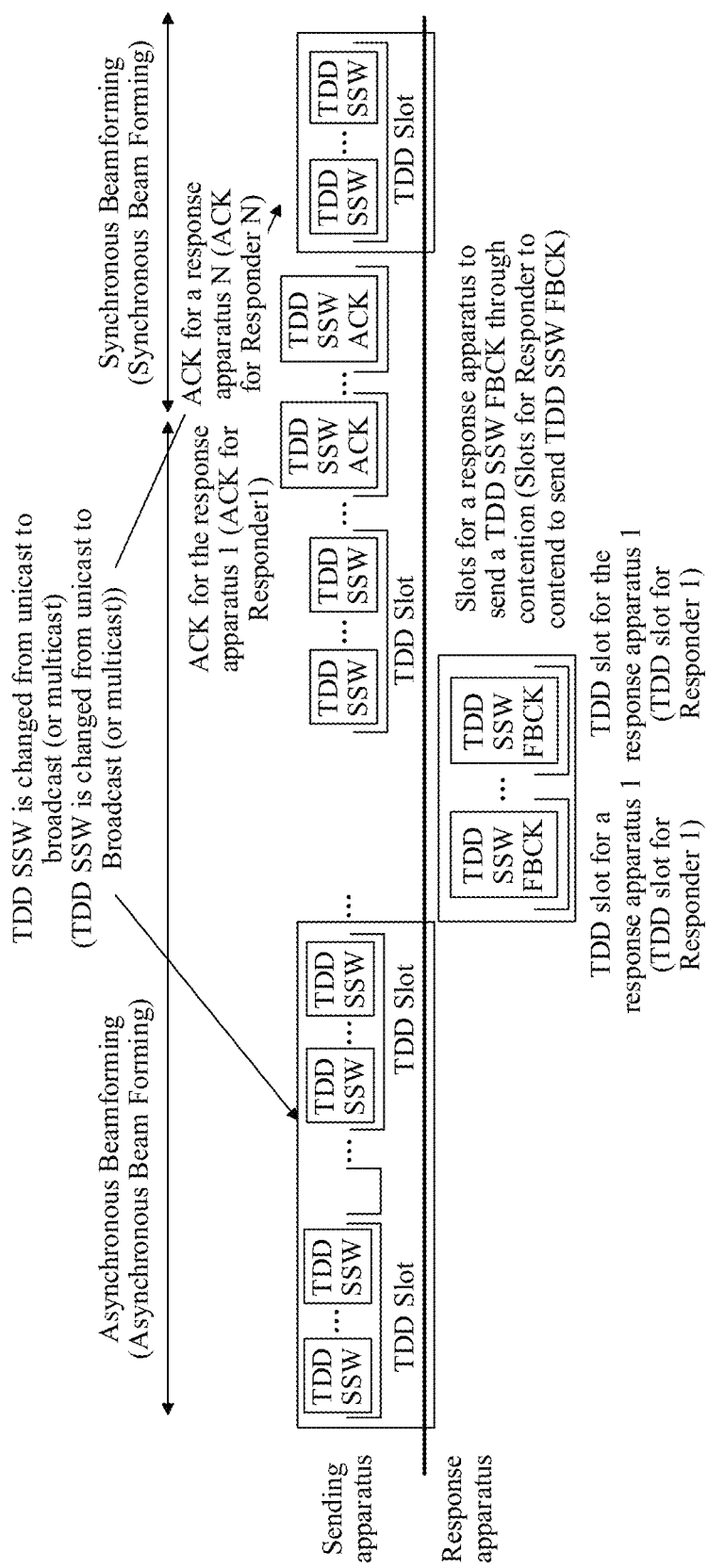
FIG. 20 is a schematic flowchart according to another embodiment of this application.

The following further provides another embodiment of this application. As shown in FIG. 20, the method includes the following steps.

Figure 21:
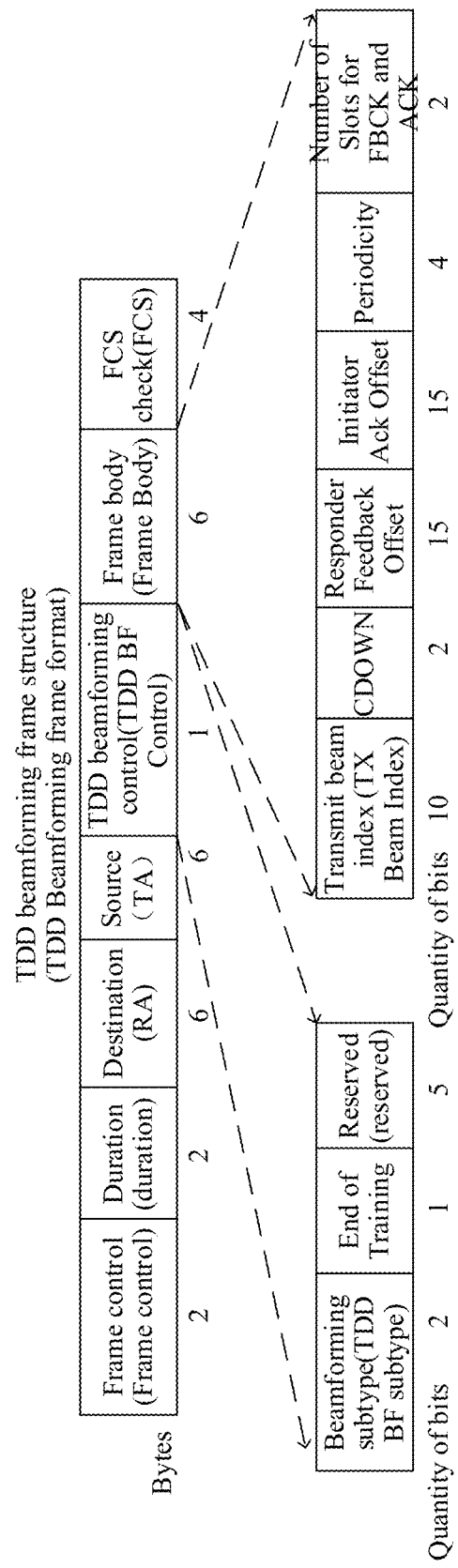
FIG. 21 is a schematic diagram of a frame structure of a TDD SSW frame according to another embodiment of this application.

1. An initiator sends a series of TDD SSWs, where the frame may be in two formats:
   a. When an RA is unicast, the frame is sent to a specific responder, in other words, BF training is performed in a one-to-one correspondence. In this case, a frame structure of the TDD SSW is the same as that of Intel. A purpose is to control a length of the frame to be less than or equal to 27 bytes. Otherwise, an LDPC symbol is redundant. In this case, a relatively long time is caused. If a frame sent to one responder is also in a uniform format, the length may be greater than 27 bytes.
   b. When an RA is broadcast or a special ID, the frame is used to indicate a special time for sending a TDD SSW FBCK through random contention and a corresponding time for returning TDD SSW ACK, in other words, BF training is performed in a one-to-one or one-to-many correspondence. However, an object of BF training is unknown and is determined in a random contention manner. A frame structure is shown in FIG. 21.

2. The responder may perform RX beam scanning. If the responder receives a TDD SSW, the responder uses an indicated responder feedback offset as a start location, and then returns a TDD SSW feedback in one slot randomly selected from one or more slots (indicated by a number of slots for FBCK and ACK).

3. The Initiator uses an indicated initiator Ack offset as a start location, and then returns a TDD SSW ACK to each responder in a slot of each TDD SSW ACK in a sequence of receiving TDD SSW FBCKs.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A sending apparatus comprising:
   a processor, configured to generate a first frame, wherein the first frame comprises time resource indication information; and
   a transceiver, configured to cooperate with the processor to send the first frame to at least two response apparatuses;
   wherein the first frame further comprises a destination indication field that includes a multicast or broadcast address corresponding to the at least two response apparatuses;
   wherein the time resource indication information comprises at least two pieces of sub-time resource indication information, each piece of sub-time resource indication information is in a one-to-one correspondence with one of the at least two response apparatuses, and
   each piece of sub-time resource indication information comprises a first time resource which is for a corresponding response apparatus to send feedback information for the first frame to the sending apparatus, and a second time resource which is for the sending apparatus to send acknowledgment information for the feedback information to the corresponding response apparatus; and
   wherein the processor is further configured to perform beamforming training with the corresponding response apparatus by using the second time resource to send the acknowledgment information in response to the corresponding response apparatus using the first time resource to send the feedback information.

2. The sending apparatus according claim 1, wherein the transceiver is further configured to cooperate with the processor to receive, at the first time resource, a feedback frame from the corresponding response apparatus, wherein the feedback frame comprises the feedback information of the corresponding response apparatus for the first frame.

3. The sending apparatus according to claim 2, wherein the transceiver is further configured to cooperate with the processor to send an acknowledgment frame to the corresponding response apparatus at the second time resource, wherein the acknowledgment frame comprises the acknowledgment information for the feedback information.

4. The sending apparatus according to claim 1, wherein each piece of sub-time resource indication information comprises one or any combination of the following pieces of information:
   an identifier subfield used to identify a response apparatus, or a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield.

5. The sending apparatus according to claim 4, wherein the identifier subfield is a media access control (MAC) address of the corresponding response apparatus, or an identification (ID) with a length that is obtained based on the MAC address of the corresponding response apparatus and that is less than that of the MAC address, or a pre-allocated ID.

6. The sending apparatus according to claim 1, wherein the first frame further comprises a response apparatus quantity field, which indicates a quantity of the at least two response apparatuses.

7. The sending apparatus according to claim 1, wherein each piece of sub-time resource indication information further comprises an end indication subfield, the end indication subfield indicates whether the time resource indication field ends.

8. A response apparatus comprising:
   a transceiver, configured to cooperate with a processor to receive a first frame, wherein the first frame comprises time resource indication information, wherein the first frame further comprises a destination indication field that includes a multicast or broadcast address corresponding to at least two response apparatuses, the time resource indication information comprises at least two pieces of sub-time resource indication information, each piece of sub-time resource indication information is in a one-to-one correspondence with one of at least two response apparatuses, and each piece of sub-time resource indication information comprises a first time resource which is for a corresponding response apparatus to send feedback information for the first frame to a sending apparatus, and a second time resource which is for the sending apparatus to send acknowledgment information for the feedback information to the corresponding response apparatus;
   the processor, configured to obtain, based on the first frame, the first time resource and the second time resource; and further configured to perform beamforming training with the sending apparatus by using the first time resource to send the feedback information and by using the second time resource to receive the acknowledgement information from the sending apparatus.

9. The response apparatus according to claim 8, wherein the transceiver is further configured to cooperate with the processor to send a feedback frame to the sending apparatus at the first time resource, wherein the feedback frame comprises the feedback information of the response apparatus for the first frame.

10. The response apparatus according to claim 9, wherein the transceiver is further configured to cooperate with the processor to receive, at the second time resource, an acknowledgment frame from the sending apparatus, wherein the acknowledgment frame comprises the acknowledgment information for the feedback information.

11. The response apparatus according to claim 8, wherein each piece of sub-time resource indication information comprises one or any combination of the following pieces of information:
an identifier subfield used to identify a response apparatus, or a time resource indication subfield used by the response apparatus corresponding to the identifier subfield to send feedback information for the first frame to the sending apparatus, or a time resource indication subfield used by the sending apparatus to send acknowledgment information for the feedback information to the response apparatus corresponding to the identifier subfield.

12. The response apparatus according to claim 11, wherein the identifier subfield is a media access control (MAC) address of the response apparatus, or an identification (ID) with a length that is obtained based on the MAC address of the response apparatus and that is less than that of the MAC address, or a pre-allocated ID.

13. The response apparatus according to claim 8, wherein the first frame further comprises a response apparatus quantity field, which indicates a quantity of the at least one response apparatus.

14. The response apparatus according to claim 8, wherein each piece of sub-time resource indication information field further comprises an end indication subfield, and the end indication subfield indicates whether the time resource indication field ends.

* * * * *